(12) United States Patent
Tse et al.

(10) Patent No.: US 8,997,203 B2
(45) Date of Patent: Mar. 31, 2015

(54) FILTERING NETWORK PACKETS IN MULTIPLE FORWARDING INFORMATION BASE SYSTEMS

(75) Inventors: Chi Chiu Tse, Markham (CA); Jason Songbo Xu, Toronto (CA); Ania Halliop, Mississauga (CA); Chun Hei Justin Lai, Markham (CA)

(73) Assignee: BlackBerry Limited, Waterloo, ON (CA)

( * ) Notice: Subject to any disclaimer, the term of this patent is extended or adjusted under 35 U.S.C. 154(b) by 42 days.

(21) Appl. No.: 13/568,735

(22) Filed: Aug. 7, 2012

(65) Prior Publication Data

US 2014/0047534 A1 Feb. 13, 2014

(51) Int. Cl.
*G06F 21/00* (2013.01)
*H04L 29/06* (2006.01)

(52) U.S. Cl.
CPC ......... *H04L 63/0272* (2013.01); *H04L 63/0485* (2013.01); *H04L 63/164* (2013.01)
USPC .......................................................... 726/13

(58) Field of Classification Search
None
See application file for complete search history.

(56) References Cited

U.S. PATENT DOCUMENTS

| | | | |
|---|---|---|---|
| 6,996,657 B1 * | 2/2006 | Chambers et al. | 710/310 |
| 7,209,491 B2 * | 4/2007 | Zheng et al. | 370/477 |
| 7,213,263 B2 * | 5/2007 | Makineni et al. | 726/11 |
| 7,685,317 B2 * | 3/2010 | Iyer | 709/248 |
| 8,027,752 B2 * | 9/2011 | Castaldo et al. | 700/296 |
| 8,345,712 B2 * | 1/2013 | Sood et al. | 370/466 |
| 8,346,929 B1 * | 1/2013 | Lai | 709/226 |
| 8,429,075 B2 * | 4/2013 | Smith et al. | 705/41 |
| 8,442,042 B2 * | 5/2013 | McCoy | 370/389 |
| 2004/0123139 A1 * | 6/2004 | Aiello et al. | 713/201 |
| 2004/0215819 A1 * | 10/2004 | Tsuruoka et al. | 709/238 |
| 2004/0260937 A1 * | 12/2004 | Narayanan | 713/200 |
| 2006/0056297 A1 * | 3/2006 | Bryson et al. | 370/230 |
| 2007/0133548 A1 * | 6/2007 | Kim et al. | 370/392 |
| 2008/0081609 A1 * | 4/2008 | Burgan et al. | 455/425 |
| 2008/0104212 A1 * | 5/2008 | Ebrom et al. | 709/222 |
| 2008/0127325 A1 * | 5/2008 | Ebrom et al. | 726/14 |
| 2008/0141360 A1 * | 6/2008 | Hicks et al. | 726/15 |
| 2008/0188963 A1 * | 8/2008 | McCoy | 700/90 |
| 2009/0040066 A1 * | 2/2009 | Ebrom et al. | 340/825.22 |
| 2010/0100616 A1 * | 4/2010 | Bryson et al. | 709/223 |
| 2010/0169420 A1 * | 7/2010 | McCoy et al. | 709/204 |
| 2011/0154477 A1 | 6/2011 | Parla et al. | |
| 2012/0143939 A1 * | 6/2012 | Kang et al. | 709/201 |

FOREIGN PATENT DOCUMENTS

WO    WO 2009014975 A1 *   1/2009   .............. G06F 21/00

OTHER PUBLICATIONS

Authors: S. Kent, K. Seo Title: Security Architecture for the Internet Protocol, RFC-4301. Dec. 2005, BBN Technologies.*
Extended European Search Report issued in EP Application No. 12179589.2 on Feb. 13, 2013; 8 pages.

* cited by examiner

*Primary Examiner* — Dede Zecher
*Assistant Examiner* — Richard McCoy
(74) *Attorney, Agent, or Firm* — Fish & Richardson P.C.

(57) ABSTRACT

In some implementations, a method for routing communication includes determining a binding interface for a communication session based on a forwarding information base (FIB) and a destination for the communication session. The communication session is from an application running on user equipment (UE), and the binding interface is included in a virtual private network (VPN) tunnel established through an Internet Protocol (IP) security (IPsec) interface. Whether to filter the communication session is determined based on which perimeter of the UE includes the binding interface and which perimeter of the UE includes the IPsec interface.

20 Claims, 17 Drawing Sheets

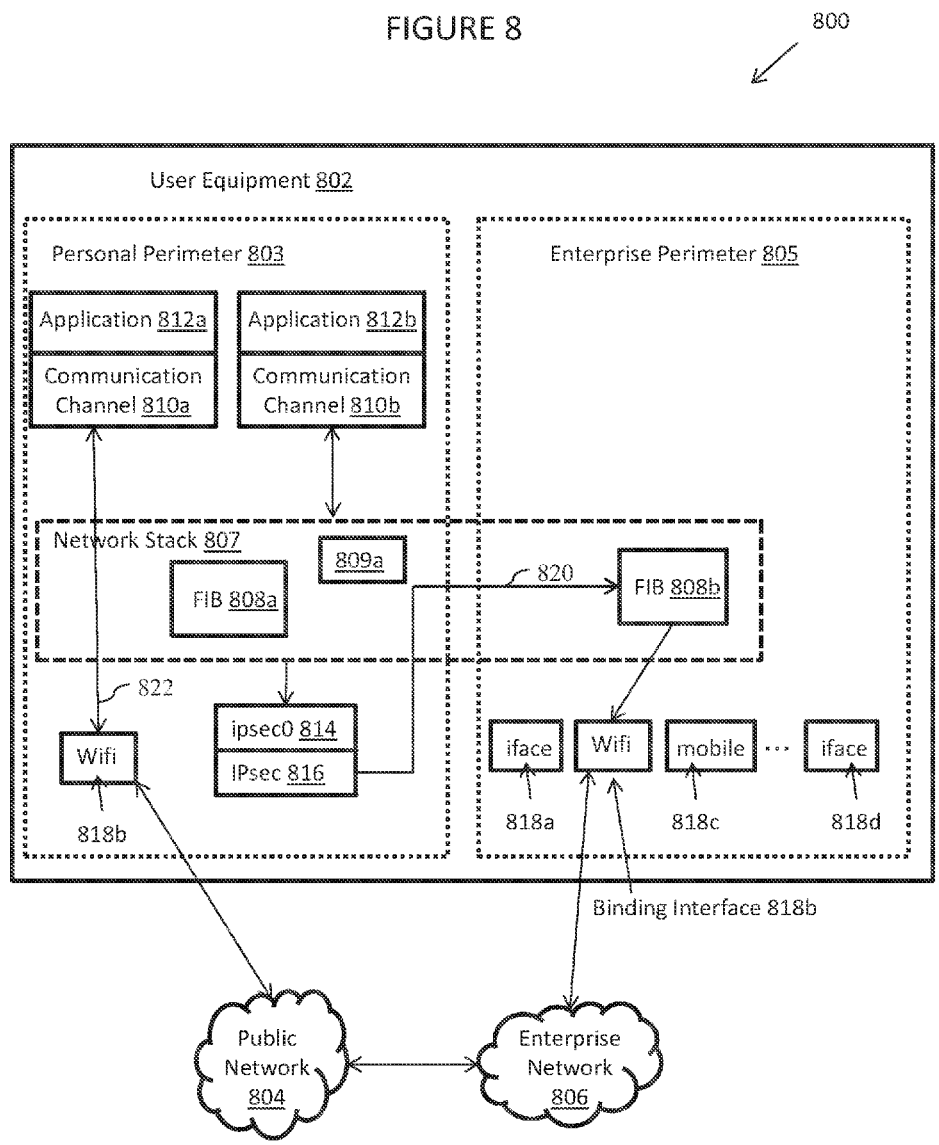

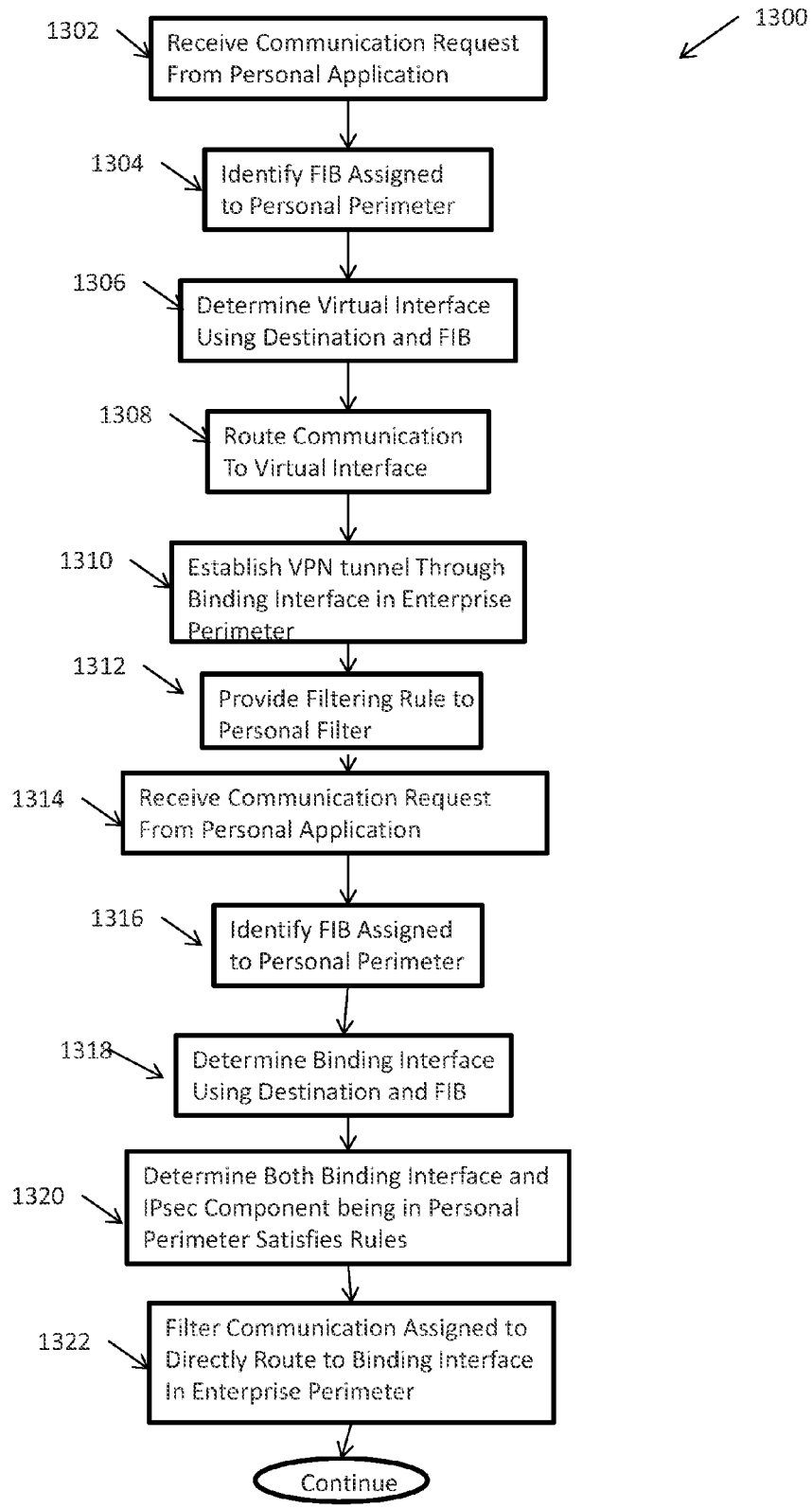

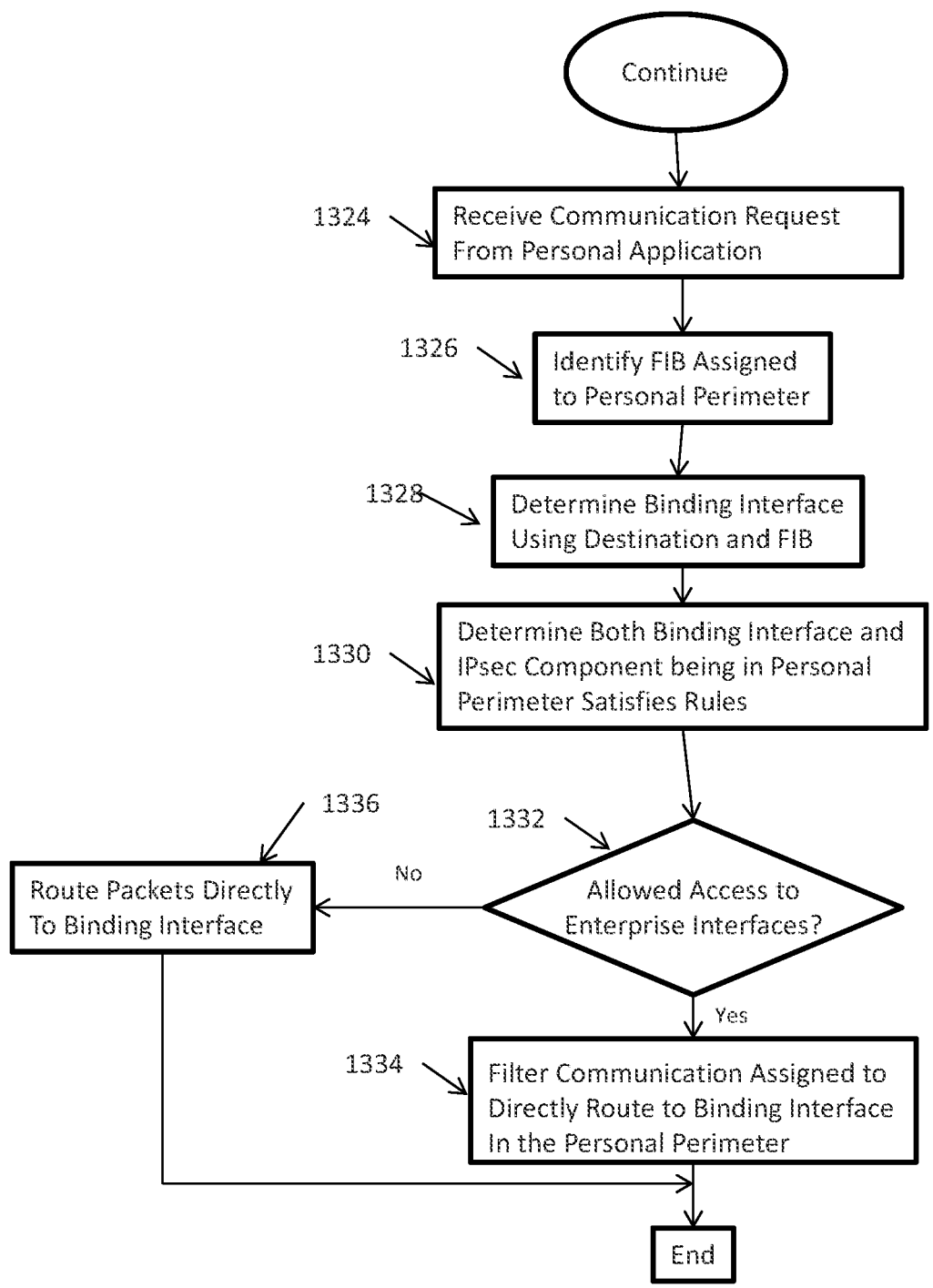

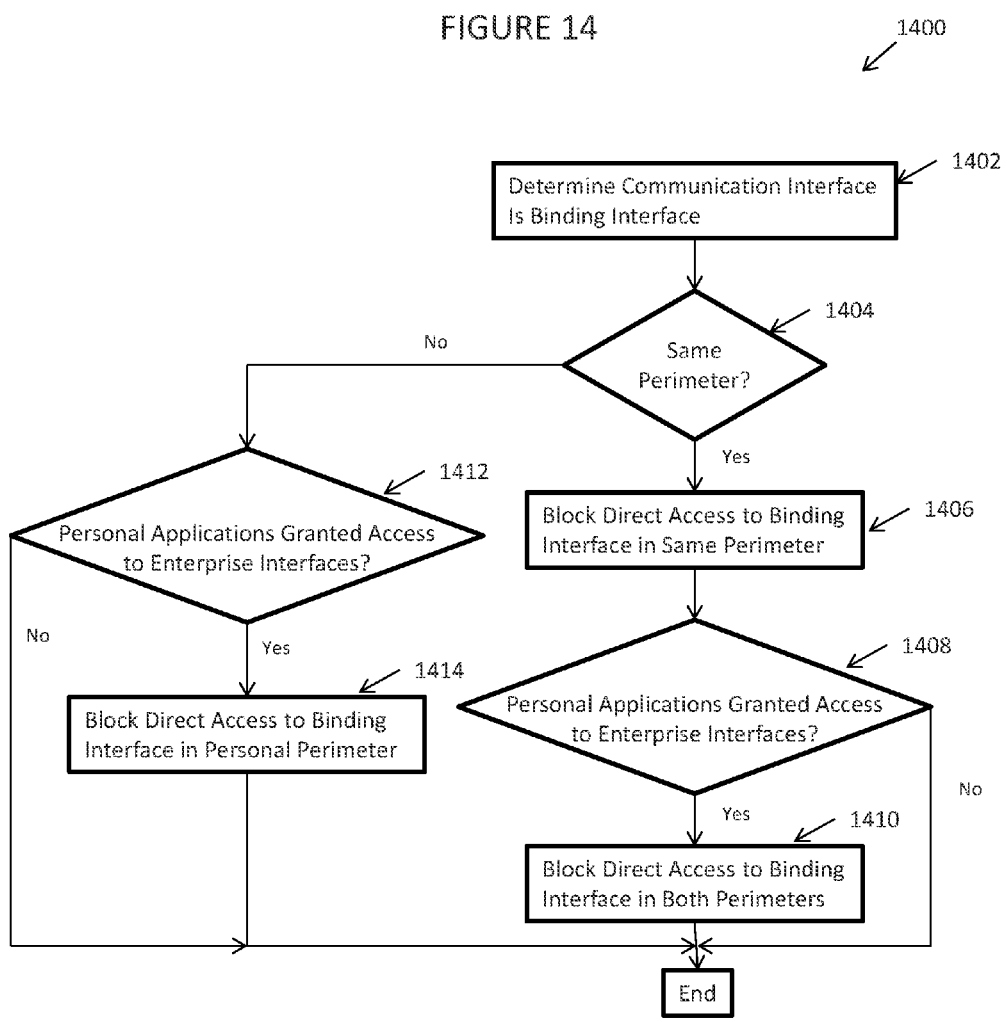

FILTERING NETWORK PACKETS IN MULTIPLE FORWARDING INFORMATION BASE SYSTEMS

TECHNICAL FIELD

This invention relates to filtering packets in multiple forwarding information base systems.

BACKGROUND

Generally, a virtual private network (VPN) is a network that uses a public telecommunication infrastructure (e.g., Internet) to create a secure virtual connection for communication between two or more entities. The secure connection may be accomplished through the use of a "tunnel" between the two or more entities. A VPN may utilize various protocols to establish the tunnel and to secure communications between the sender and recipient. For example, one protocol is Internet Protocol Security (IPsec). When implementing IPsec, each IP packet of a data stream is authenticated and encrypted to protect data flows in the VPN.

DESCRIPTION OF DRAWINGS

FIG. 8 is a communication system with direct routing to a shared interface;

FIGS. 13A and 13B is a flowchart illustrating an example method for filtering packets with both the binding interface and the IPsec interface in the enterprise perimeter; and FIG. 14 is another flowchart illustrating an example method for filtering packets in MFIB systems.

Like reference symbols in the various drawings indicate like elements.

DETAILED DESCRIPTION

Figure 1:
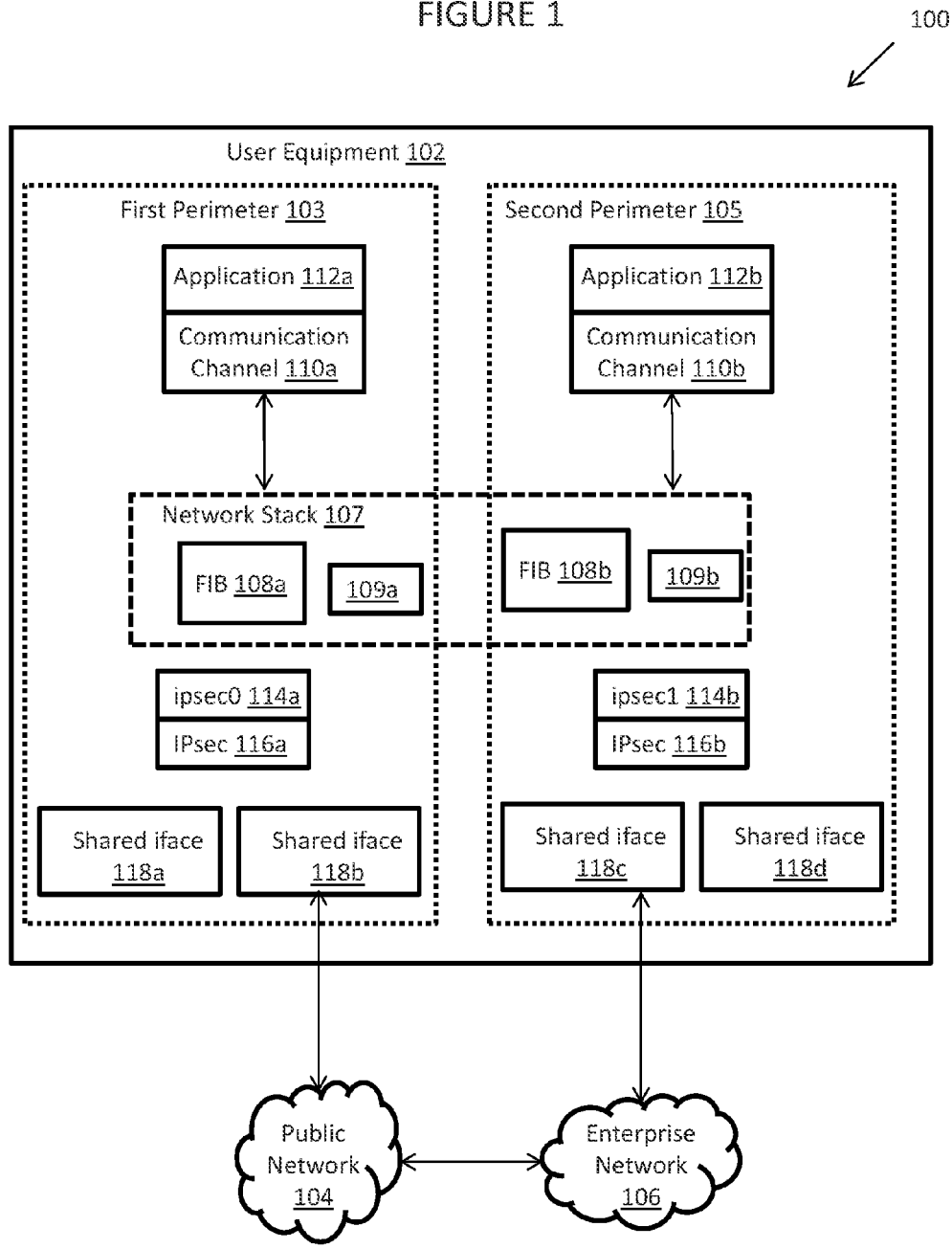
FIG. 1 is an example communication system using multiple forwarding information bases (MFIB) and a VPN.

In some implementations, a method for routing communication includes determining a binding interface for a communication session based on a forwarding information base (FIB) and a destination for the communication session. The communication session is from an application running on user equipment (UE), and the binding interface is included in a virtual private network (VPN) tunnel established through an Internet Protocol (IP) security (IPsec) interface. Whether to filter the communication session is determined based on which perimeter of the UE includes the binding interface and which perimeter of the UE includes the IPsec interface.

Specific implementations can include one or more of the following features. The binding interface, the IPsec interface, and the application is determined to be included in a same perimeter, and packets for the communication session from the application are filtered to substantially prevent direct access to the binding interface. When the same perimeter is an enterprise perimeter and applications in a personal perimeter are granted access to interfaces in the enterprise perimeter, packets for communication session from applications in both the personal perimeter and the enterprise perimeter are filtered to substantially prevent direct access to the binding interface. When binding interface and the IPsec interface are determined to be included different perimeters and applications in a personal perimeter are granted access to interfaces in an enterprise perimeter is determined, packets for communication session from applications in the personal perimeter are filtered to substantially prevent direct access to the binding interface. When binding interface and the IPsec interface are determined to be included different perimeters and applications in a personal perimeter are determined to be prohibited access to interfaces in an enterprise perimeter, packets from the communication session are routed directly to the binding interface.

In other words, the present disclosure is directed to filtering network packets communications in multiple forwarding information base (MFIB) systems. For example, network packets for a communication session may be filtered if the assigned interface for the communication session is currently being used in a VPN tunnel. In some implementations, a forwarding information base (FIB) can be a data structure that associates destinations with communication interface information (e.g., physical interfaces), and MFIBs can be multiple forwarding information bases locally stored in user equipment (UE). In addition, each FIB in the MFIB may be assigned to different perimeters of a UE. In general, a security/trusted domain or perimeter may refer to a logical separation of resources, such as at least one of applications, stored data, or network access. In some implementations, perimeter resources which are not shared may be encrypted and password protected to, for example, securely separate those resources from resources in different perimeters. For example, unshared resources in one perimeter may be prohibited from accessing unshared resources assigned to a different perimeter. Shared network resources, on the other hand, may include resources (e.g., physical interfaces) shared by two or more perimeters. For example, a first perimeter (e.g., personal perimeter) and a second perimeter (e.g., enterprise perimeter) may share at least one of a WiFi interface, a Bluetooth interface, or other interface.

In some implementations, split tunneling can be prevented in MFIB systems with multiple network perimeters. For example, shared interfaces may not be allowed to bypass a VPN once a VPN tunnel has been established. With MFIB and different perimeters, one enterprise interface may be assigned to multiple perimeters such as assigned to both a personal perimeter and an enterprise perimeter. In these instances, packets routed through shared interfaces in a particular perimeter may be controlled, filtered or otherwise managed based on one or more of the following: which perimeter includes the binding interface, i.e., the interface a VPN is established over; which perimeter includes the VPN interface; system settings allowing personal applications to use enterprise interfaces; or other communication information. Based on all or some of the identified information, a set of behaviors which both adheres to specified security policies (e.g., not allowing split tunneling) may be defined as well as allow routing traffic to a shared interface when routed through a different perimeter. In some implementations, split tunneling in an MFIB system can be prevented or otherwise reduced by removing enterprise interfaces from certain perimeters and associated FIBs. In some implementations, split tunneling in an MFIB system can be prevented by extending packet filter capabilities of a UE, which may include filtering network packets based on which perimeters include the binding interface and the virtual interface. In addition, when the VPN tunnel is dropped, the appropriate blocking operations may be reversed to allow traffic through the shared interface.

FIG. 1 is an example communication system 100 for filtering network packets in an MFIB system in accordance with the present disclosure. For example, the system 100 may filter packets assigned to directly route to a binding interface of a VPN tunnel. The exemplary communication system 100 includes user equipment (UE) 102 communicably coupled to a public network 104 and an enterprise network 106. The UE 102 comprises a first perimeter 103, a second perimeter 105 and a network stack 107. The first perimeter 103 includes a communication channel 110a, an application 112a, an ipsec0 virtual interface 114a, an IPsec component 116a, and shared interfaces 118a and 118b, and the second perimeter 105 includes a communication channel 110b, an application 112b, an ipsec1 virtual interface 114b, an IPsec component 116b, and shared interfaces 118c and 118d. The network stack 107 spans both the first perimeter 103 and the second perimeter 105 and includes a FIB 108a and packet filtering module 109a for the first perimeter 103 and a FIB 108b and packet filtering module 109b for the first perimeter 103. In connection with establishing a VPN tunnel, the IPsec component 116a, 116b may transmit rules to at least one of the packet filtering modules 109a or 109b identifying criteria for filtering network packets from application 112a, 112b. For example, the IPsec component 116b may transmit filtering rules to the packet filtering module 109a in connection with establishing a VPN tunnel through the shared interface 118a in the first perimeter 103. In these instances, the network stack 107 may receive, from application 112a, 112b, a communication request and determine an interface 118 for the communication session based on the FIB 108a, 108b. In connection with determining the interface, the packet filtering module 109a, 109b may determine that the interface is currently used by a VPN tunnel and whether to filter network packets from the application 112a, 112b. For example, the packet filtering module 109a, 109b may determine whether to filter packets based on which perimeter includes the binding interface 118 of a VPN and which perimeter includes the virtual interface 114a, 114b. For example, if the packet filtering module 109a, 109b determines that the interface 118 and the virtual interface 114a, 114b are in the same perimeter, the packet filtering module 109a, 109b may filter packets from application 112a, 112b routed directed to the binding interface 118. If access to the interface 118 is denied, the packet filter module 109a, 109b blocks or otherwise filters packets assigned to directly route to the binding interface 118.

The UE 102 of exemplary system 100 may be a computing device operable to receive requests from the user via a user interface, such as a Graphical User Interface (GUI), a CLI (Command Line Interface), or any of numerous other user interfaces using any suitable input device (e.g. touch screen, keyboard, track wheel, etc.). Thus, where reference is made to a particular interface, it should be understood that any other user interface may be substituted in its place. In various implementations, the UE 102 comprises an electronic computing device operable to receive, transmit, process and store any appropriate data associated with the communication system 100. The UE 102 may encompass any electronic device and/or computing device that has wireless communication capability. For example, the UE 102 may be a tablet computer, a personal computer, a laptop computer, touch screen terminal, workstation, network computer, kiosk, wireless data port, wireless or wireline phone, personal data assistant (PDA), smartphone, etc. For example, the UE 102 may comprise a wireless communication device that includes an input device, such as a keypad, touch screen, mouse, or other device that can accept information, and an output device that may convey information associated with the operation of the resources, including digital data, visual information, or GUI. Both the input device and output device may include fixed or removable storage media such as a magnetic computer disk, CD-ROM, or other suitable media to both receive input from and provide output to users of terminals 106 through the display, such as a GUI. In addition, the UE 102 may also include multiple perimeters 103 and 105.

As previously mentioned, the first perimeter 103 may substantially prevent access to perimeter resources by the second perimeter 105 such as applications 112a in the first perimeter 103. Similarly, the second perimeter 105 may substantially prevent access to resources by the first perimeter 103 such as applications 112b in the second perimeter 105. In some implementations, one or more of the perimeters 103, 105 may include password protection, encryption, and other process for controlling access to resources assigned to the perimeter such as the physical interfaces 118a-d. A perimeter 103, 105 may be generated by the device owner, a user, an administrator, or others. In some examples, a first perimeter 103 may be a personal perimeter created by default for the user and as well as managed by the user. In some examples, a second perimeter 105 may be an enterprise perimeter created by an administrator for an enterprise and may be managed, for example, by a remote management server. In some implementations, the first perimeter 103 may be associated with a personal account, and the second perimeter 105 may be associated with an enterprise account. The resources associated with a perimeter 103, 105 may be accessed by the device owner, a user, an administrator, a combination of the foregoing, or others. In some implementations, a perimeter 103, 105 may be associated with a single user or each user may access resources associated with multiple device perimeters such as both the personal perimeter 103 and the enterprise perimeter 105. In some implementations, a user may have access to resources in only one perimeter 103 or 105. In some implementations, a device owner may have the ability to remove individual perimeters 102 or 105 from the UE 402.

The network stack 107 may include any software, hardware, firmware, or combination thereof configured to coordinate communication sessions with applications 112a and 112b using the FIBs 108a and 108b, network filtering modules 109a and 109b, and the physical interfaces 118a-d. For example, the network stack 107 may verify whether a requesting application 112 has been granted permissions to access to a FIB 108 and, if so, determine an assigned interface 118 for a communication session using the FIB 108. In some implementations, the network stack 107 may manage FIBs 108a and 108b and manage connections of communication channels 110a and 110b with FIBs 108a and 108b. The FIB 108a, 108b may include any parameters, variables, policies, algorithms, instructions, settings, or rules for routing communication to at least one of the public network 104 or the enterprise network 106. For example, the FIB 108a, 108b may map a destination address to a physical interface 114, another FIB, another communication channel, or others. In general, the FIB 108a, 108b may be any data structure configured to map or otherwise associate a destination address to a physical interface 114. For example, the FIB 108a, 108b may comprise a table where each row maps a destination network address to a physical interface 114. However, the FIB 108a, 108b may be comprised of other data structures without departing from the scope of the disclosure. In some implementations, the FIB 108a, 108b may include or otherwise identify one or more of the following: a destination network address (destination); an address of the outgoing interface (gateway); a state of the route (flag); a current number of active uses for the route (refs); a count of the number of packets sent using that route (use); a maximum transmission unit (Mtu); a physical interface (interface); or others.

The packet filter module 109a, 109b may include any software, hardware, firmware, or combination thereof configured to filter network packets based on one or more rules associated with a VPN. For example, the packet filter module 109a, 109b may receive rules from a IPsec component 116a, 116b in connection with establishing an VPN tunnel through a binding interface 118 and block or otherwise filter network packets assigned to directly access the binding interface 118 without initially entering the IPsec component 116a, 116b. In some implementations, the packet filter module 109a, 109b may execute one or more of the following: receive rules for filtering network packets from an IPsec component 116a, 116b; determine whether perimeter 103 or perimeter 105 includes the binding interface 118 for the VPN tunnel; determine whether perimeter 103 or perimeter 105 includes the virtual interface 114a, 114b for the VPN tunnel; determine whether personal applications 112 are allowed to communicate over enterprise interfaces 118; determine whether network packets are assigned to directly route to the binding interface 118; determine whether the operating conditions satisfy the rules; block or otherwise filter packets in response to operating conditions satisfying the rules; release or otherwise delete rules once an associated VPN tunnel has been terminated; or others. For example, the packet filter module 109a, 109b may determine that both the binding interface 118 and the virtual interface 114a, 114b are in the same perimeter and filter network packets assigned to route directly to the binding interface independent of or without passing through the virtual interface 114a, 114b. In the event that the binding interface 118 and the virtual interface 114a, 114b are in different perimeters, the packet filter module 109a, 109b may determine whether to filter packets assigned to route directly to the binding interface based on whether personal applications have access to the enterprise interfaces. In the event that the first perimeter 103 is a personal perimeter 103 and the second perimeter 105 is a personal perimeter 105 and the personal application 112a has access to the enterprise interface 118c, 118d, the packet filter module 109a may filter network packets from the personal application 112a that are assigned to directly route to the binding interface 118.

The communication channel 110a, 110b can include any software, hardware, firmware or combination thereof configured to route communication from application 112a, 112b to at least one of the public network 104 or the enterprise network 106. For example, the communication channel 110a, 110b may be an IPC channel between the application 112a, 112b and the network stack 107, which is configured to determine a physical interface 114 to route communication based on the FIB 108a, 108b. In some implementations, the communication channel 110a, 110b may be one endpoint of a two-way communication link between an application 112a, 112b and an application running in the public network 104 or the enterprise network 106. For example, the communication channel 110a, 110b may be bound to a port number for a physical interface 114 so that the TCP layer can identify the application 112a, 112b to which data is destined to be sent. In some implementations, an application 112a, 112b may access the same communication channel 110a, 110b for all communications, and the communication channel 110a, 110b may switch between accessing the different FIBs 108a and 108b. The method of moving a communication channel 110a, 110b between two or more FIBs 108a, 108b may be executed, for example, through an out-of-band communication between the application 112a, 112b and the network stack 107 (which controls/implements the FIBs) in which network stack 107 may verify that the application 112a, 112b is allowed to access the requested FIB 108a, 108b and modify the communication channel's association accordingly.

The applications 112a, 112b may comprise any application, program, module, process, or software that may execute, change, delete, generate, or otherwise manage information, such as business information, according to the present disclosure. For example, the application 112a, 112b may include a notification application, a contacts application, a calendar application, a messaging application, or others. Further, while illustrated as internal to the UE 102, one or more processes associated with the application 112a, 112b may be stored, referenced, or executed remotely. For example, a portion of the application 112a, 112b may be an interface to a web service that is remotely executed. Moreover, the application 112a, 112b may be a child or sub-module of another software module or enterprise application (not illustrated) without departing from the scope of this disclosure. In some implementations, the application 112a, 112b may be a hosted solution that allows multiple parties in different portions of the process to perform the respective processing. For example, the enterprise network 106 may access the application 112a, 112b on the UE 102 or as a hosted application located over network 106 without departing from the scope of this disclosure. In another example, portions of the application 112a, 112b may be used by the user working directly with the UE 102, as well as remotely via, for example, enterprise network 106. In some implementations, the applications 112a, 112b may be configured to access at least one of a first perimeter 103 or a second perimeter 105.

The UE 102 may include interfaces 118a-d for communicating with other computer systems over at least one of the public network 104 or the enterprise network 106 in a client-server or other distributed environment. In certain implementations, the UE 102 receives data from internal or external senders through interfaces 118a-d for local storage, processing, or both. Generally, the interfaces 118a-d comprises logic encoded in software, hardware, firmware, or combination thereof operable to communicate with at least one of the public network 104 or the enterprise network 106. More specifically, the interfaces 118a-d may comprise software supporting one or more communications protocols associated with the public network 104 or the private network 106 or hardware operable to communicate physical signals. In the illustrated implementation, the interfaces 118a-d include a WiFi interface 118a configured to communicate with a public network 104 (e.g., Internet), a cellular interface 118b configured to communicate with a public network 104 (e.g., a cellular network), a LAN interface 118c configured to wireless communication with the enterprise network 106, and a Bluetooth interface 118d for communicating with fixed or mobile devices over short distances. The interfaces 118a-d are for illustrate purposes only, and the UE 102 may include all, some, or different interfaces without department from the scope of this disclosure.

The UE 102 may be connected to multiple networks, such as, for example, the public network 104 and the enterprise network 106. The public network 104 may, for example, be a public broadband network such as the Internet. The enterprise network 106 may, for example, be a network associated with an enterprise. The enterprise may comprise a corporate or business entity, a government body, a non-profit institution, or any other organization associated with the UE 102. For example, the enterprise may be the owner of the UE 102 or may lease the UE 102 and may hire contractors or agents who are responsible for maintaining, configuring, controlling, and/or managing the UE 102. In the illustrated implementation, the network 104, 106 may facilitate wireless and/or wireline communication with the UE 102. The network 104, 106 may communicate, for example, using Internet Protocol (IP) packets, Frame Relay frames, Asynchronous Transfer Mode (ATM) cells, voice, video, data, and other suitable information between network addresses. In addition, while the public network 104 and the enterprise network 106 are each illustrated as a single network, the network 104, 106, or both may comprise a plurality of networks. In short, the public network 104 and the enterprise network 106 may comprise any suitable network(s) configured to communicate with the UE 102.

FIGS. 2-14 are directed to MFIB systems with a personal perimeter and an enterprise perimeter. For example, FIG. 3 includes the first perimeter 103 as a personal perimeter 303 and the second perimeter 105 as an enterprise perimeter 305. Though, these implementations are for illustration purposes only and packet filtering in MFIB systems may include some, more, all, or different perimeters without departing from the scope of this disclosure. For example, the UE may only include multiple enterprise perimeters.

Figure 2:
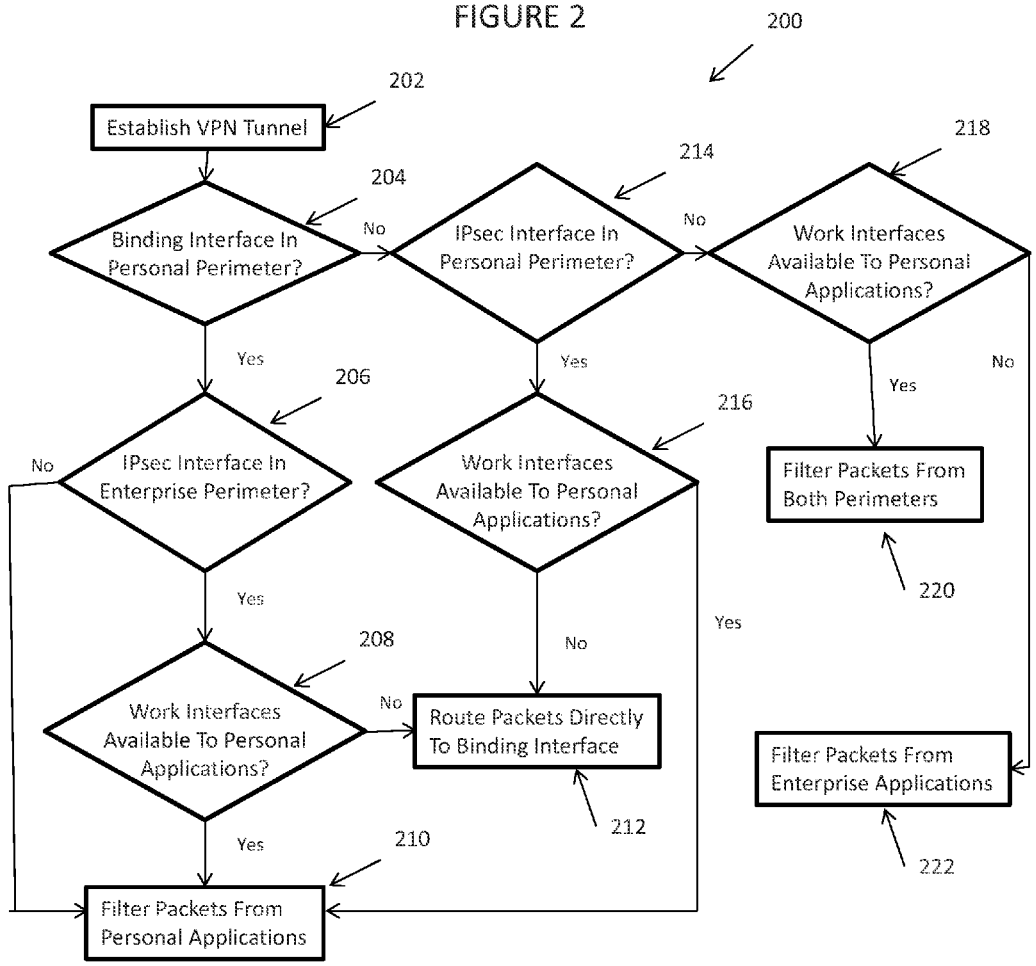
FIG. 2 is a flowchart illustrating an example method for filtering packets in an MFIB system.

FIG. 2 is a flow chart illustrating an example method 200 for filtering packets in a MFIB system. While the method 200 is described with respect to FIG. 1, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 200 begins at step 202 where a VPN tunnel is established. The application 112a, 112b may transmit a communication request to the network stack 107, which determines a virtual interface 114a, 114b based on the FIB 108a, 108b. The associated IPsec component 116a, 116b establishes a VPN tunnel through a shared interface 118a, 118b or 118c, 118d. If the binding interface of the VPN tunnel is in the personal perimeter at decisional step 204, then execution proceeds to decisional step 206. In the example, the shared interface 118a, 118b may be located in a personal perimeter 103. If the IPsec interface is in an enterprise perimeter at decisional step 206, then execution proceeds to decisional step 208. If the IPsec is also in the personal perimeter, then, at step 210, network packets from personal applications are filtered. As for the example, if the packet filtering module 109a determines that both the ipsec0 interface 114a and the shared interface 118a, 118b are in the personal perimeter 103, the packet filtering module 109a filters packets from personal applications, including the personal application 112a, that are assigned to the shared interface 118a, 118b. Returning to decisional step 208, if enterprise interfaces are available to personal applications, then, at step 210, network packets from personal applications are filtered. In the example, the network filtering module 109a may determine that the binding interface 118a, 118b is in the personal perimeter 103, the ipsec1 interface 114b interface is in the enterprise perimeter 105, and the personal application 112a has access to the shared interface 118c, 118d in the enterprise perimeter 105 and, in response, filter packets from the personal application 112a assigned to the binding interface 118a, 118b. Again returning to decisional step 208, if enterprise interfaces are not available to personal applications, then, at step 212, the packets are directly routed to the binding interface. In the example, the network filtering module 109a may determine that the binding interface 118a, 118b is in the personal perimeter 103, the ipsec1 interface 114b interface is in the enterprise perimeter 105, and the personal application 112a does not have access to the shared interface 118c, 118d in the enterprise perimeter 105 and, in response, routes packets from the personal application 112a directly to the binding interface 118a, 118b.

Returning to decisional step 204, if the binding interface is in the enterprise perimeter, execution proceeds to decisional step 214. If the IPsec interface is in the person perimeter, then execution proceeds to decisional step 216. If enterprise interfaces are available to personal applications, then, at step 210, network packets from personal applications are filtered. In the example, the network filtering module 209b may determine that the binding interface 118c, 118d is in the enterprise perimeter 105, the ipsec0 interface 114a is in the personal perimeter 103, and the personal application 112a has access to the shared interface 118c, 118d in the enterprise perimeter 105 and, in response, filter packets from the personal application 112a assigned to the binding interface 118a, 118b. If enterprise interfaces are not available to personal applications, then, at step 212, the packets are directly routed to the binding interface. In the example, the network filtering module 109b may determine that the binding interface 118c, 118d is in the enterprise perimeter 105, the ipsec0 interface 114a is in the personal perimeter 103, and the personal application 112a does not have access to the shared interface 118c, 118d in the enterprise perimeter 105 and, in response, routes packets from the enterprise application 112b directly to the binding interface 118c, 118d. Returning to decisional step 214, if the IPsec interface is in the enterprise perimeter, execution proceeds to decisional step 218. If enterprise interfaces are available to personal applications, packets from both the personal and enterprise perimeter are filtered at step 220. As for the example, the packet filtering module 109b determines that both the binding interface and the IPsec are in the enterprise perimeter 105 and the interface 118c, 118d is available to the personal application 112a, the packet filtering module 109a and 109b filter packets assigned to the binding interface 118c, 118d. Returning to decisional step 218, if the enterprise interfaces are not available to personal applications, packets from enterprise applications are filtered. In the example, the packet filtering module 109b may determine that both the binding interface and the IPsec interface are in the enterprise perimeter 105 and the interface 118c, 118d are not available to the personal application 112a. In these instances, the packet filtering module 109b may filter packets from the enterprise application 112b assigned to directly route to the binding interface 118c, 118d.

Figure 3:
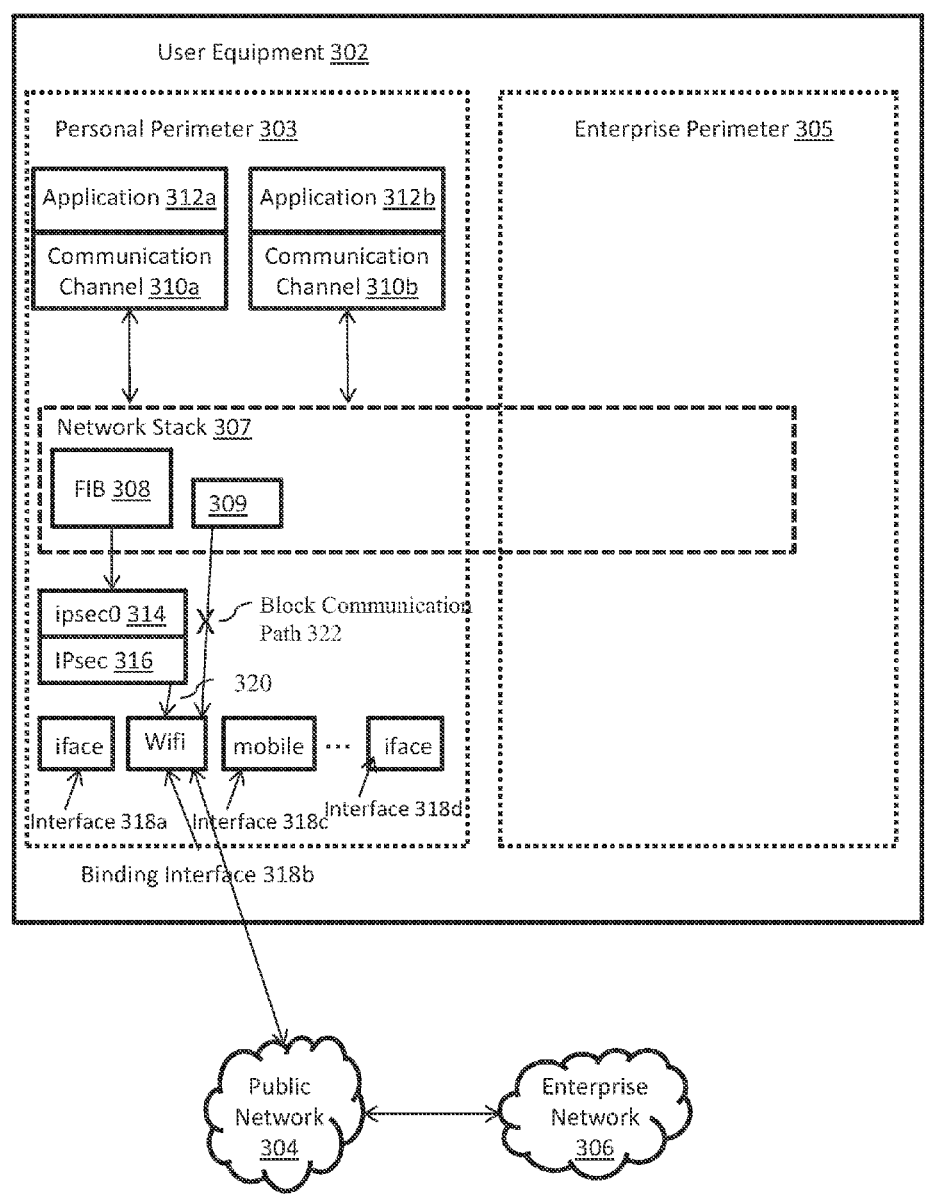
FIG. 3 is an example communication system with a binding interface and an IPsec interface in a personal perimeter.

FIG. 3 illustrates an example communication system 300 for filtering packets in a personal perimeter 202 including a VPN tunnel 320. In the illustrated implementation, the personal perimeter 303 includes personal applications 312a and 312b, the ipsec0 virtual interface 314 and an IPsec component 316. The IPsec component 816 includes any software, hardware, firmware, or combination thereof for generating a VPN tunnel 320 through the personal perimeter 303. For example, a personal application 312a may use the IPsec component 316 to establish an encrypted tunnel 320 through the WiFi interface 318b and the public network 304 to an enterprise VPN gateway. In connection with establishing the VPN tunnel 320, the IPsec component 316 may transmit, to the packet filtering module 309, rules for filtering packets directly routed to the Wifi interface 318b without initially being routed through the ipsec0 virtual interface 314. In some aspects of operation, the personal application 312b may transmit a communication request to the network stack 307 for accesses to the public network 304. The network stack 307 may identify the FIB 308a assigned to the personal perimeter 303 and determine the WiFi interface 318b is assigned to the communication based on the FIB 308a. Also, the packet filtering module 309 may determine that the WiFi interface 318b is in the personal perimeter 303 and is currently used by the VPN tunnel 320 established through the ipsec0 virtual interface 314 in the personal perimeter 303. In addition, the packet filtering module 309 may determine that these operating conditions match the rules from the IPsec component 316. In response, the packet filtering module 309 may filter network packets assigned to be directly routed to the Wifi interface 318b, which is indicated by the blocked communication path 322.

Figure 4:
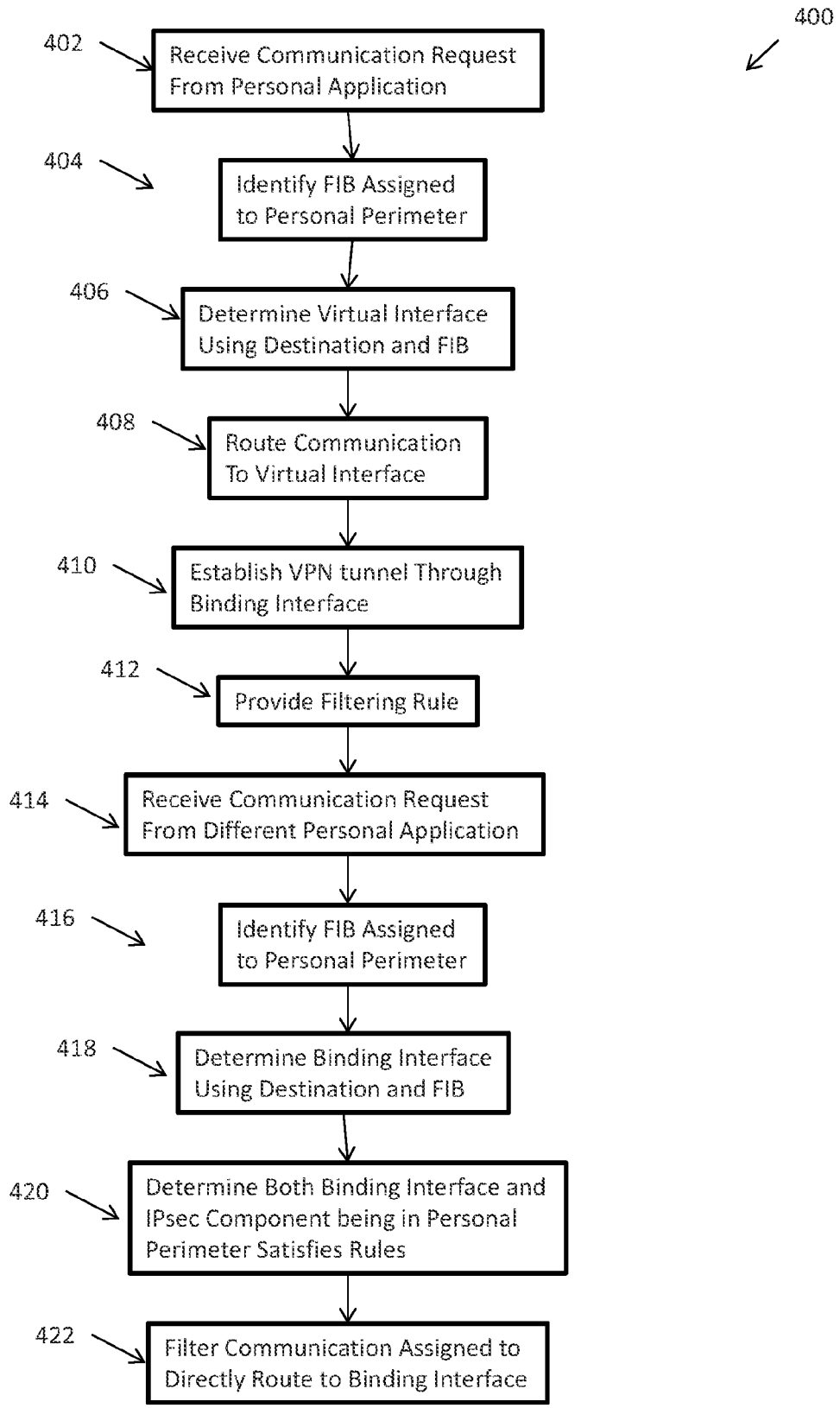
FIG. 4 is a flowchart illustrating an example method for filtering packets with the binding interface and the IPsec interface in the personal perimeter.

FIG. 4 is a flow chart illustrating an example method 400 for filtering packets when both a binding interface and an IPsec component are in a personal perimeter. While the method 400 is described with respect to FIG. 3, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 400 begins at step 402 where a communication request is received from a person application. For example, the personal application 312a of FIG. 3 may transmit a communication request to the network stack 307. At step 404, a FIB assigned to the personal perimeter is identified. In the example, the network stack 307 may identified FIB 308 assigned to the personal perimeter 303. Next, at step 406, a virtual interface is identified based on the destination of the communication and the identified FIB. As for the example, the network stack 307 may identified the ipsec0 virtual interface 314 based on the FIB 308 and destination indicated in the request. At step 408, communication from the personal application is routed to the virtual interface. In the example, the network stack 307 routes, to the ipsec0 interface 314, communication from the personal application 312a. Next, at step 410, a VPN tunnel is established through a binding interface. Again in the example, the IPsec component 316 establishes a VPN tunnel through the Wifi interface 318b. At step 412, filtering rules are provided. As for the example, the IPsec component 316 may transmit filtering rules to the packet filtering module 309. A communication request from a different personal application is received at step 414. In the example, the personal application 312b may transmit a communication request to the network stack 307. At step 416, the FIB assigned to the personal perimeter is identified. As for the example, the network stack 307 may identify the FIB 308 assigned to the personal perimeter 303. Next, at step 418, the binding interface is determined based on the destination and the FIB. In the example, the network stack 307 may determine that the communication is assigned to directly route to the Wifi interface 318b based on the FIB 308 and the destination. At step 420, both binding interface and the IPsec component being in the personal perimeter satisfies the filtering rules is determined. Communication assigned to directly route to the binding interface is filtered. For example, the packet filtering module 309 may filter communication from the personal application 312b.

Figure 5:
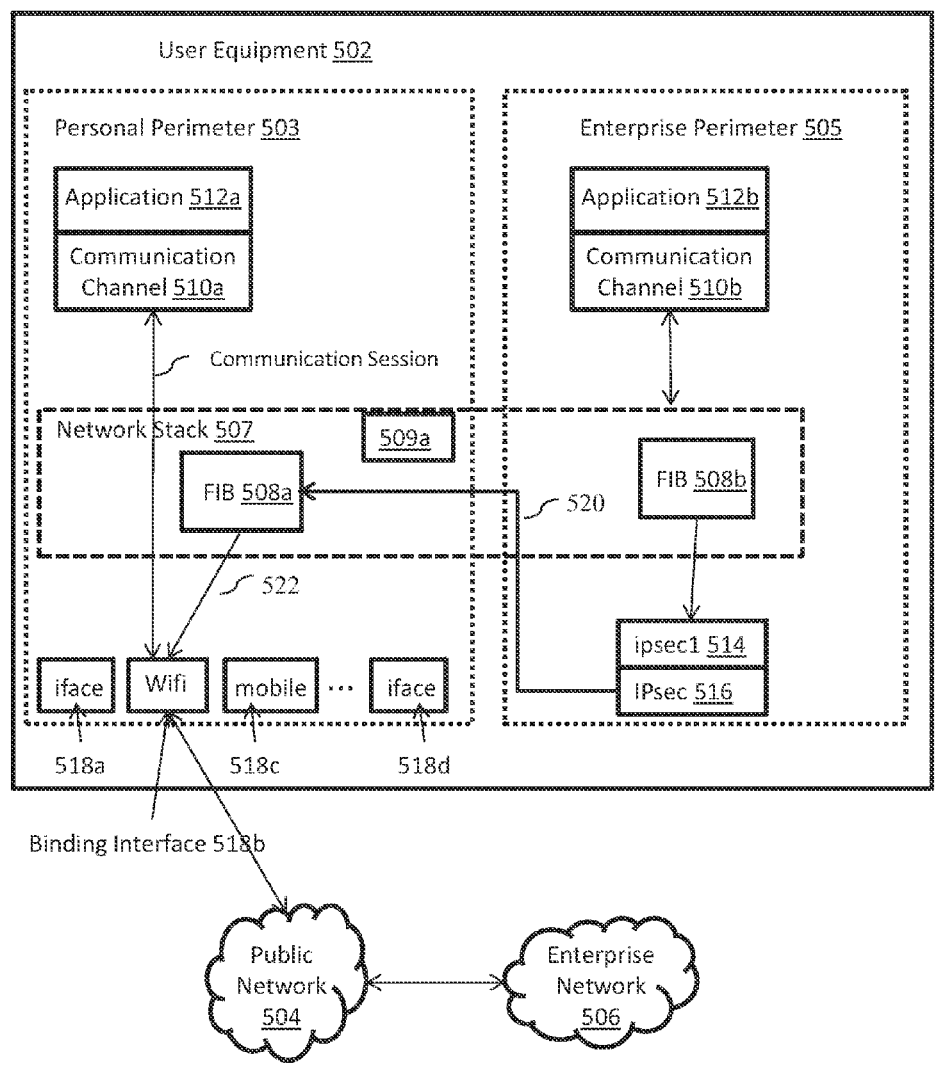
FIG. 5 is a communication system with direct routing to a binding interface in a personal perimeter.
Figure 6:
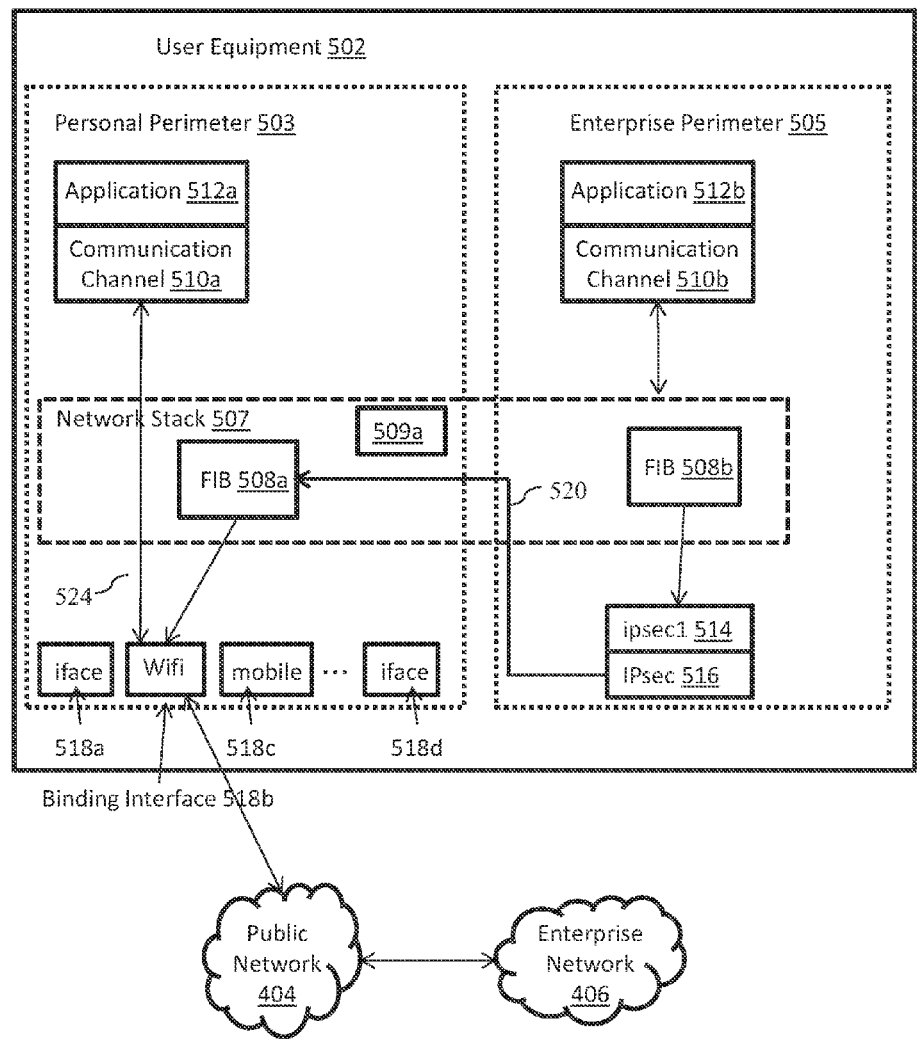
FIG. 6 is a communication system for filtering packets directly routed to a binding interface in a personal perimeter.

FIGS. 5 and 6 illustrate example communication systems 500 and 600, respectively, for filtering packets with a binding interface 518b in a personal perimeter 503 and an IPsec interface 514 in an enterprise perimeter 505. In the illustrated implementation, the UE 502 includes a personal perimeter 503 and the enterprise perimeter 505. The personal perimeter 503 includes a personal application 312a and a binding interface 518b, and the enterprise perimeter 505 includes an enterprise application 312b, an ipsec1 virtual interface 514 and an IPsec component 516. The IPsec component 816 is configured to establish a VPN tunnel 520 from the enterprise perimeter 505 through the personal perimeter 303. For example, the enterprise application 312b may use the IPsec component 516 to establish an encrypted tunnel 520 through the WiFi interface 518b in the personal perimeter 503 and the public network 504 to an enterprise VPN gateway. In connection with establishing the VPN tunnel 520, the IPsec component 516 may transmit, to the packet filtering module 509a in the personal perimeter 503, rules for filtering packets directly routed to the Wifi interface 518b. In some aspects of operation, the personal application 512a may transmit a communication request to the network stack 507 for accesses to the public network 504. The network stack 507 may identify the FIB 508a assigned to the personal perimeter 503 and determine the WiFi interface 518b is assigned to the communication session based on the FIB 508a. Also, the packet filtering module 509a may determine that the WiFi interface 518b is in the personal perimeter 503 and is currently used by the VPN tunnel 520 established through the ipsec1 virtual interface 514 in the enterprise perimeter 503. In addition, the packet filtering module 509a may also determine whether the personal application 312a is allowed over interfaces (not illustrated) in the enterprise perimeter 405. If the personal application 312a is not allowed access to enterprise interfaces, the network stack 507 routes the communication directly to the Wifi interface 518b as illustrated by the signal path 522 in FIG. 5. If the personal application 312a is allowed access to enterprise interfaces, the packet filtering module 509a may determine that the operating conditions match the filter rules and, in response, filter network packets assigned to be directly routed to the Wifi interface 318b, which is indicated by the blocked signal path 524 in FIG. 6.

Figure 7A:
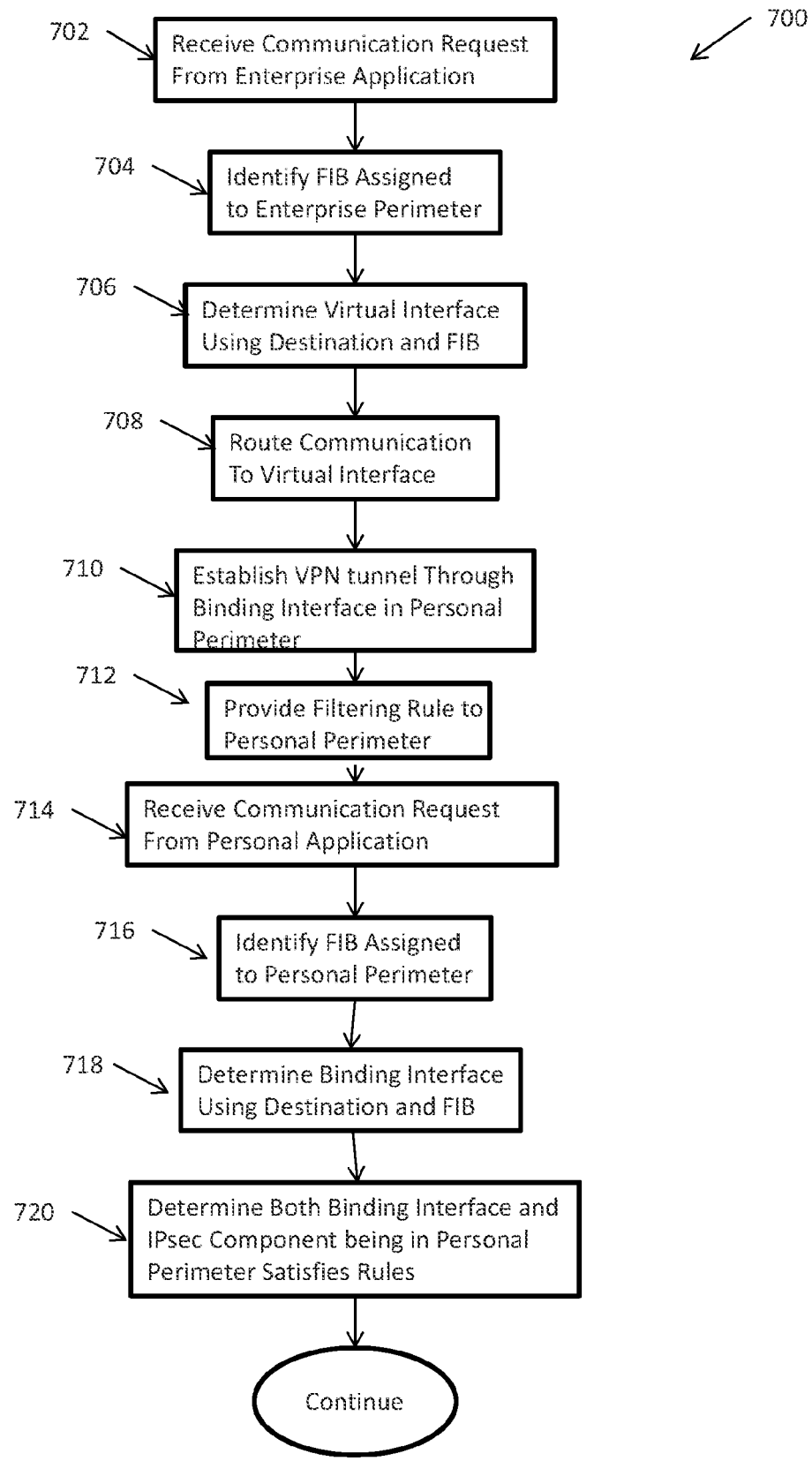
FIGS. 7A and 7B is a flowchart illustrating an example method for filtering packets directly routed to a binding interface in a personal perimeter.
Figure 7B:
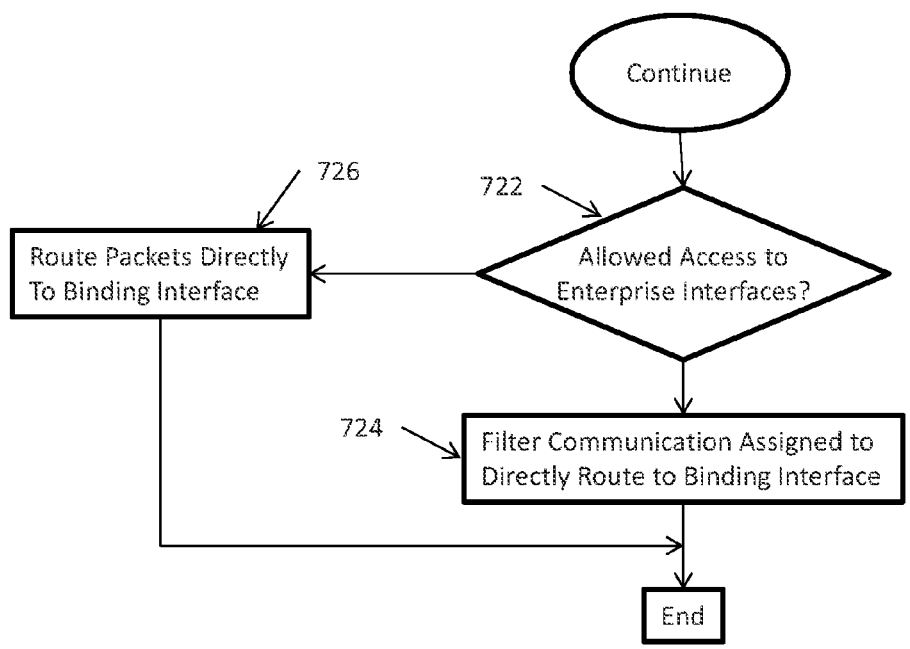

FIGS. 7A and 7B are a flow chart illustrating an example method 700 for filtering packets when both a binding interface and an IPsec component are in a personal perimeter. While the method 700 is described with respect to FIGS. 5 and 6, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 700 begins at step 702 where a communication request is received from a person application. For example, the enterprise application 512b of FIGS. 5 and 6 may transmit a communication request to the network stack 507. At step 704, a FIB assigned to the enterprise perimeter is identified. In the example, the network stack 507 may identified FIB 508b assigned to the enterprise perimeter 505. Next, at step 706, a virtual interface is identified based on the destination of the communication and the identified FIB. As for the example, the network stack 507 may identified the ipsec1 virtual interface 514 based on the FIB 508b and destination indicated in the request. At step 708, communication from the enterprise application is routed to the virtual interface. In the example, the network stack 507 routes, to the ipsec1 interface 514, communication from the enterprise application 312b. Next, at step 710, a VPN tunnel is established through a binding interface. Again in the example, the IPsec component 516 establishes a VPN tunnel 520 through the Wifi interface 518b in the personal perimeter 503. At step 712, filtering rules are provided. As for the example, the IPsec component 516 in the enterprise perimeter 505 may transmit filtering rules to the packet filtering module 509a in the personal perimeter 503. A communication request from a personal application is received at step 714. In the example, the personal application 512a may transmit a communication request to the network stack 507. At step 716, the FIB assigned to the personal perimeter is identified. As for the example, the network stack 507 may identify the FIB 508a assigned to the personal perimeter 503. Next, at step 518, the binding interface is determined for the communication session based on the destination and the FIB. In the example, the network stack 507 may determine that the communication is assigned to directly route to the Wifi interface 518b based on the FIB 508a and the destination. If personal applications are allowed access to enterprise interfaces at decisional step 722, then, at step 726, communication assigned to directly route to the binding interface is filter. If the personal applications are not allowed access to the enterprise interfaces, then, at step 726, the packets are routed directly to the binding interface. As for the example, the packet filtering module 509a may determine whether the person application 512a is granted access to one or more enterprise interfaces. If access is not granted, the network stack 507 may route communication from the personal application 512a directly to the Wifi interface 518b as illustrated by the signal path 522 in FIG. 5. If access is granted, the packet filtering module 509a may filter communication from the personal application 512a as illustrated by the block signal path 524 in FIG. 6.

Figure 9:
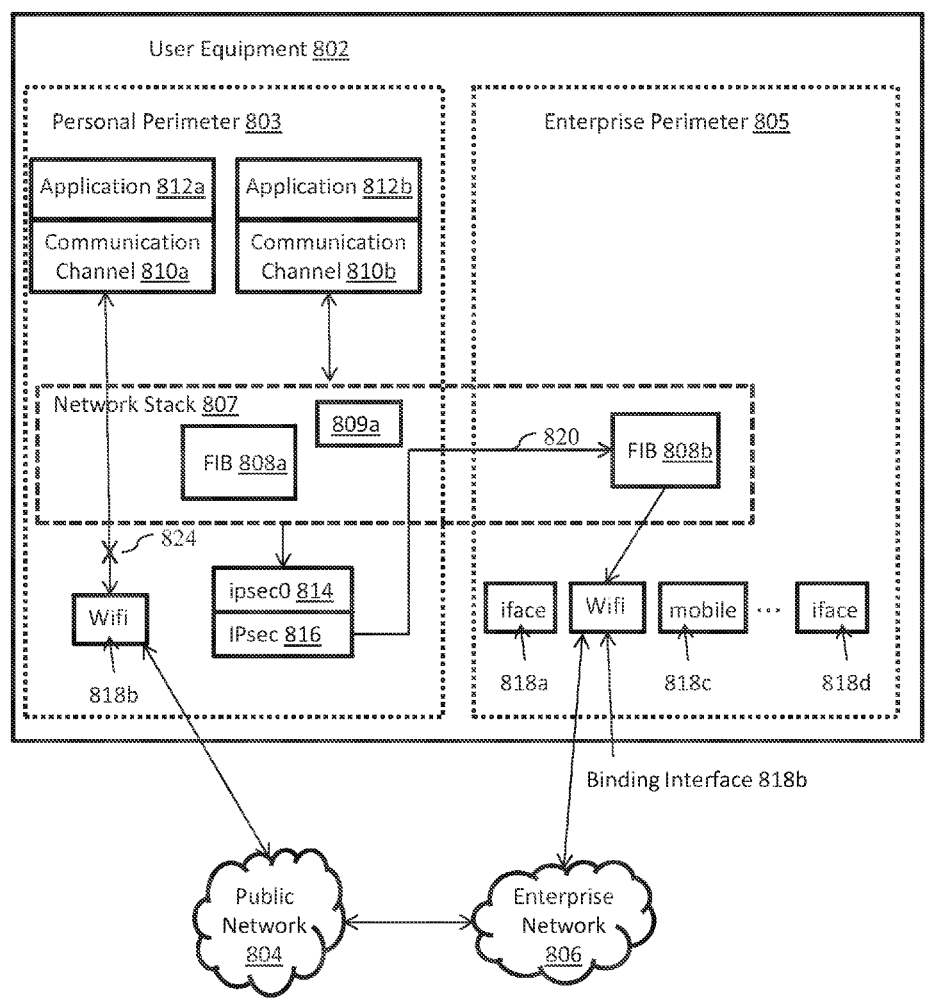
FIG. 9 is a communication system for filtering packets directly routed to a shared interface.

FIGS. 8 and 9 illustrate example communication systems 800 and 900, respectively, for filtering packets with a binding interface 818b in an enterprise perimeter 805 and an IPsec interface 814 in a personal perimeter 803. In the illustrated implementation, the UE 802 includes a personal perimeter 803 and the enterprise perimeter 805. The personal perimeter 803 includes a personal application 812a and 812b, a shared interface 818b, an ipsec0 virtual interface 814, and an IPsec component 816, and the enterprise perimeter 805 includes the binding interface 818b. The IPsec component 816 is configured to establish a VPN tunnel 820 from the personal perimeter 803 through the enterprise perimeter 805. For example, the personal application 812a may use the IPsec component 816 to establish an encrypted tunnel 820 through the WiFi interface 818b in the enterprise perimeter 805 and the public network 504 to an enterprise VPN gateway. In connection with establishing the VPN tunnel 820, the IPsec component 816 may transmit, to the packet filtering module 809a in the personal perimeter 803, rules for filtering packets directly routed to the Wifi interface 818b. In some aspects of operation, the personal application 812a may transmit a communication request to the network stack 807 for accesses to the public network 804. The network stack 807 may identify the FIB 808a assigned to the personal perimeter 803 and determine the WiFi interface 818b is assigned to the communication based on the FIB 808a. Also, the packet filtering module 809a may determine that the WiFi interface 818b is in the enterprise perimeter 805 and is currently used by the VPN tunnel 820 established through the ipsec0 virtual interface 814 in the personal perimeter 803. In addition, the packet filtering module 809a may also determine whether the personal application 812a is allowed access to interfaces 818a-d in the enterprise perimeter 405. If the personal application 812a is not allowed access to enterprise interfaces 818a-d, the network stack 807 routes the communication directly to the Wifi interface 818b as illustrated by the signal path 822 in FIG. 8. If the personal application 812a is allowed access to enterprise interfaces, the packet filtering module 809a may determine that the operating conditions match the filter rules and, in response, filter network packets assigned to be directly routed to the Wifi interface 818b, which is indicated by the blocked signal path 824 in FIG. 9.

Figure 10A:
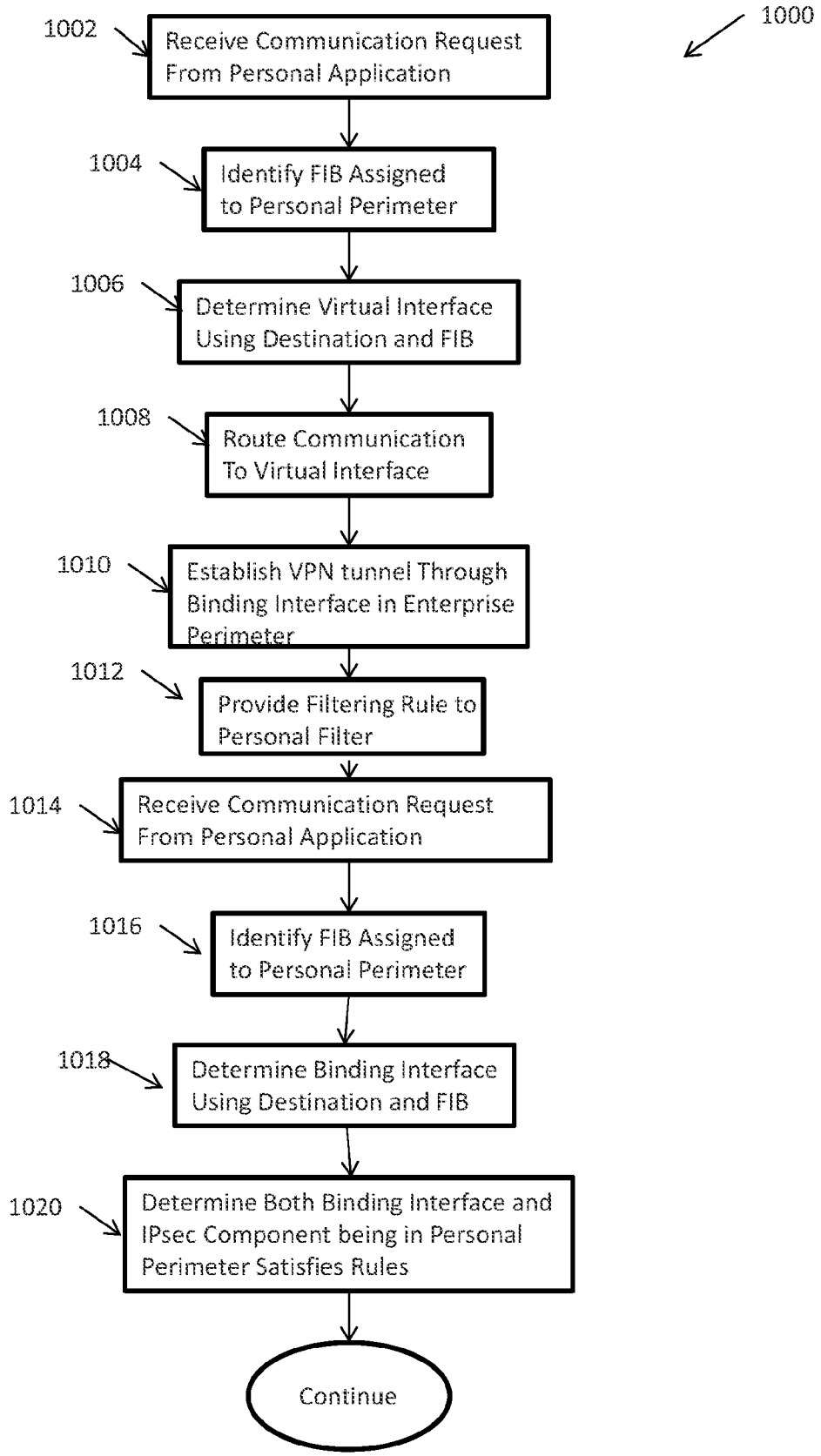
FIGS. 10A and 10B is a flowchart illustrating an example method for filtering packets directly routed to a shared interface.
Figure 10B:
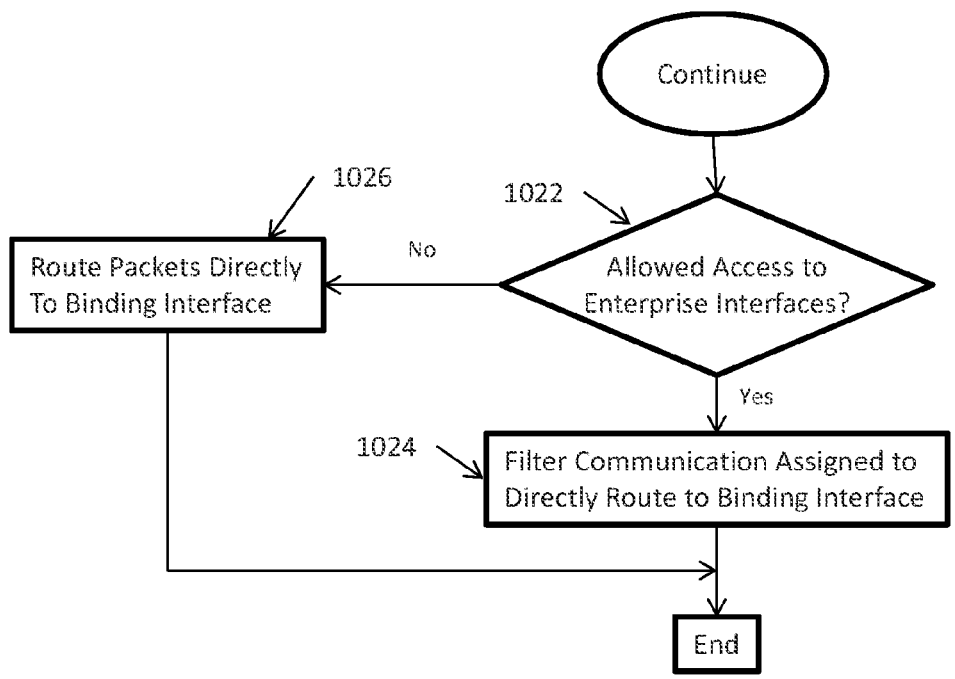

FIGS. 10A and 10B are a flow chart illustrating an example method 1000 for filtering packets when both a binding interface and an IPsec component are in a personal perimeter. While the method 1000 is described with respect to FIGS. 8 and 9, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 1000 begins at step 1002 where a communication request is received from a person application. For example, the personal application 812b of FIGS. 8 and 9 may transmit a communication request to the network stack 807. At step 1004, a FIB assigned to the personal perimeter is identified. In the example, the network stack 807 may identify FIB 808a as assigned to the personal perimeter 803. Next, at step 1006, a virtual interface is identified based on the destination of the communication and the identified FIB. As for the example, the network stack 807 may identified the ipsec0 virtual interface 814 based on the FIB 808a and destination indicated in the request. At step 1008, communication from the personal application is routed to the virtual interface. In the example, the network stack 807 routes, to the ipsec0 interface 814, communication from the personal application 312b. Next, at step 1010, a VPN tunnel is established through a binding interface. Again in the example, the IPsec component 816 establishes a VPN tunnel 820 through the Wifi interface 818b in the enterprise perimeter 805. At step 1012, filtering rules are provided. As for the example, the IPsec component 816 in the personal perimeter 803 may transmit filtering rules to the packet filtering module 809a in the personal perimeter 803.

A communication request from a personal application is received at step 814. In the example, the personal application 812a may transmit a communication request to the network stack 807. At step 1016, the FIB assigned to the personal perimeter is identified. As for the example, the network stack 807 may identify the FIB 808a assigned to the personal perimeter 803. Next, at step 818, the binding interface is determined for the communication session based on the destination and the FIB. In the example, the network stack 807 may determine that the communication is assigned to directly route to the Wifi interface 818b based on the FIB 808a and the destination. If personal applications are allowed access to enterprise interfaces at decisional step 1022, then, at step 1026, communication assigned to directly route to the binding interface is filter. If the personal applications are not allowed access to the enterprise interfaces, then, at step 1026, the packets are routed directly to the binding interface. As for the example, the packet filtering module 809a may determine whether the person application 812a is granted access to one or more enterprise interfaces. If access is not granted, the network stack 807 may route communication from the personal application 812a directly to the Wifi interface 818b as illustrated by the signal path 822 in FIG. 8. If access is granted, the packet filtering module 809a may filter communication from the personal application 812a as illustrated by the block signal path 824 in FIG. 9.

Figure 11:
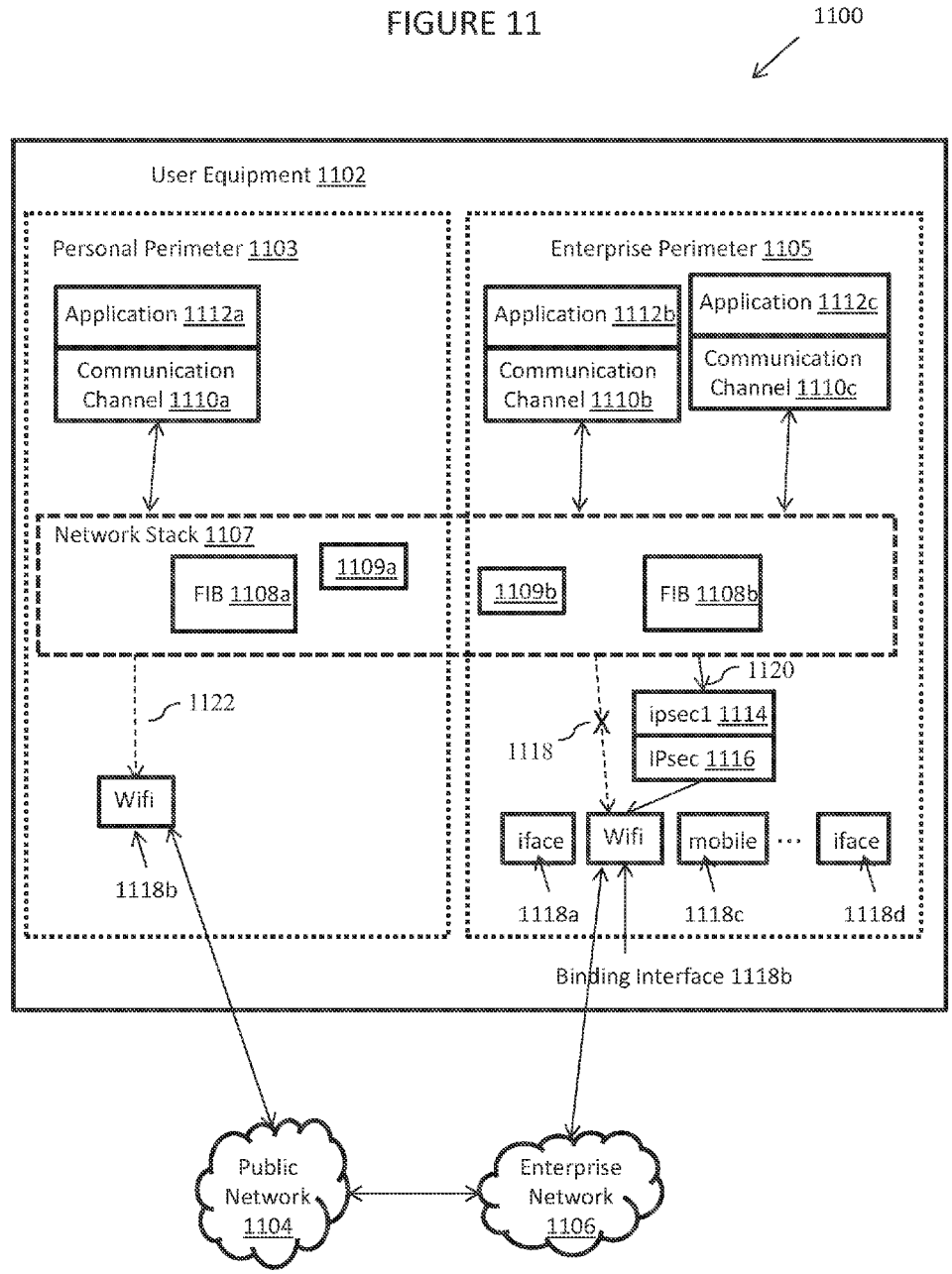
FIG. 11 is a communication system for routing packets with both a binding interface and an IPsec interface in an enterprise perimeter.
Figure 12:
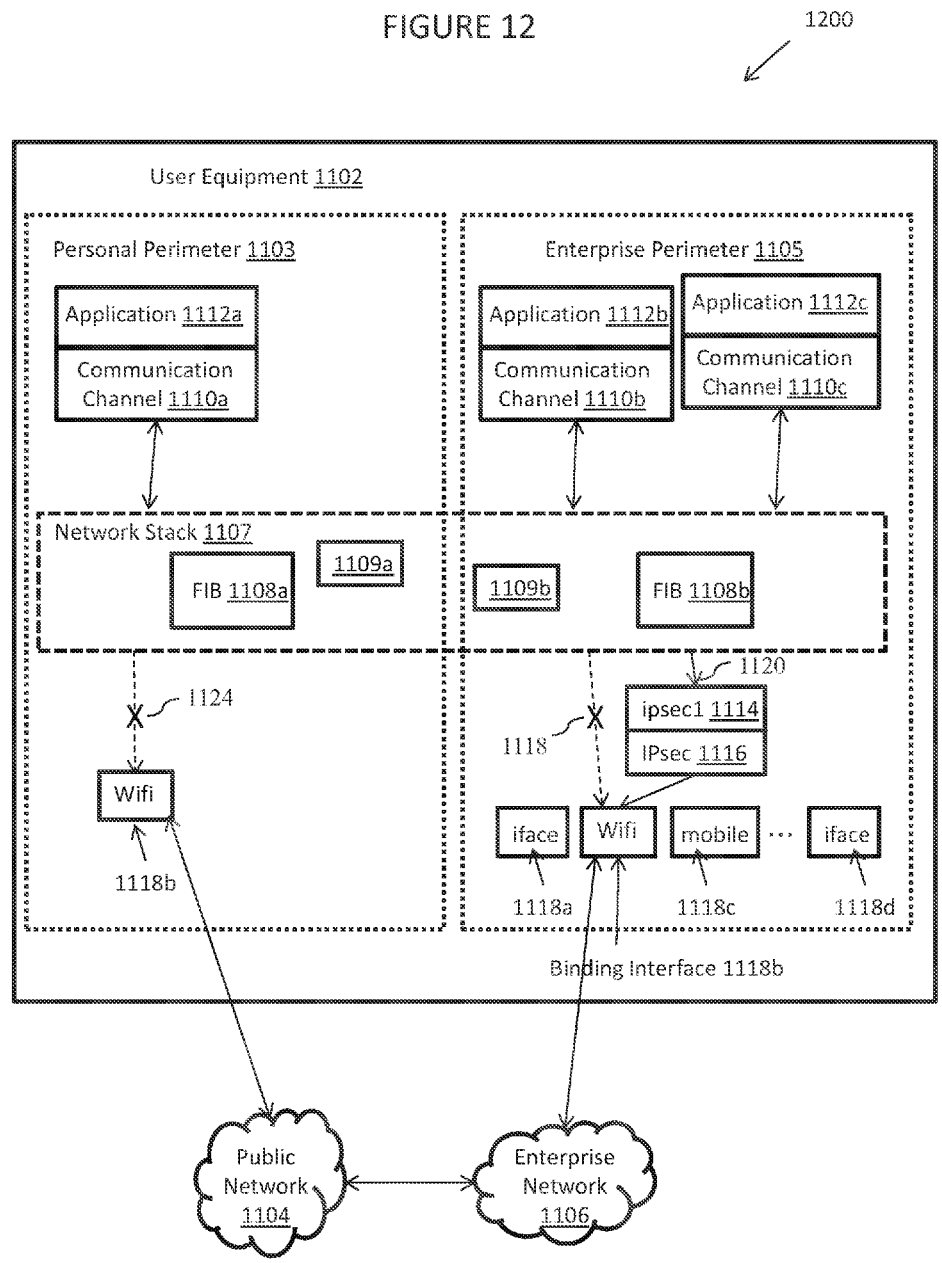
FIG. 12 is a communication system for filtering packets with both the binding interface and the IPsec interface in the enterprise perimeter.

FIGS. 11 and 12 illustrate example communication systems 1100 and 1200, respectively, for filtering packets with both a binding interface 1118b and an IPsec interface 1114 in an enterprise perimeter 1105. In the illustrated implementation, the UE 1102 includes a personal perimeter 1103 and the enterprise perimeter 1105. The personal perimeter 1103 includes a personal application 1112a and a shared interface 1118b, and the enterprise perimeter 1105 includes enterprise applications 1112c and 1112c, an ipsec1 virtual interface 1114, an IPsec component 1116, and the binding interface 1118b. The IPsec component 1116 is configured to establish a VPN tunnel 1120 in the enterprise perimeter 1105. For example, the enterprise application 1112c may use the IPsec component 1116 to establish an encrypted tunnel 1120 through the WiFi interface 1118b in the enterprise perimeter 1105 and the public network 1104 to an enterprise VPN gateway. In connection with establishing the VPN tunnel 1120, the IPsec component 1116 may transmit, to the packet filtering module 1109b in the enterprise perimeter 1105, rules for filtering packets directly routed to the Wifi interface 1118b. In some aspects of operation, the enterprise application 1112b may transmit a communication request to the network stack 1107 for accesses to the public network 1104. The network stack 1107 may identify the FIB 1108b assigned to the enterprise perimeter 1105 and determine the WiFi interface 1118b is assigned to the communication based on the FIB 808b. Also, the packet filtering module 1109a may determine the WiFi interface 1118b for communication in the enterprise perimeter 1105 and the WiFi interface 1118b is currently used by the VPN tunnel 1120 established through the ipsec1 virtual interface 1114 in the enterprise perimeter 1103. In response, the packet filtering module 1109a may filter packets from the enterprise application 1112b while the VPN tunnel 1120 is established.

In addition, the personal application 1112a may transmit a communication request to the network stack 1107 for accesses to the public network 1104. The network stack 1107 may identify the FIB 1108a assigned to the personal perimeter 1103 and determine the WiFi interface 1118b is assigned to the communication based on the FIB 1108a. Also, the packet filtering module 1109a may determine the WiFi interface 1118b for communication is in the personal perimeter 1103 and that the WiFi interface 1118b is currently used by the VPN tunnel 1120 established through the ipsec1 virtual interface 1114 in the enterprise perimeter 1103. Also, the packet filtering module 1109a may also determine whether the personal application 1112a is allowed access to interfaces 1118a-d in the enterprise perimeter 1105. If the personal application 1112a is not allowed access to enterprise interfaces 1118a-d, the network stack 1107 routes the communication directly to the Wifi interface 1118b as illustrated by the signal path 822 in FIG. 11. If the personal application 1112a is allowed access to enterprise interfaces, the packet filtering module 1109a may determine that the operating conditions match the filter rules and, in response, filter network packets assigned to be directly routed to the Wifi interface 1118b, which is indicated by the blocked signal path 1124 in FIG. 12.

FIGS. 13A and 13B are a flow chart illustrating an example method 1000 for filtering packets when both a binding interface and an IPsec interface are in an enterprise perimeter. While the method 1300 is described with respect to FIGS. 11 and 12, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 1300 begins at step 1302 where a communication request is received from an enterprise application. For example, the enterprise application 1112c of FIGS. 11 and 12 may transmit a communication request to the network stack 1107. At step 1304, a FIB assigned to the enterprise perimeter is identified. In the example, the network stack 1107 may identified FIB 1108b assigned to the enterprise perimeter 1105. Next, at step 1306, a virtual interface is identified based on the destination of the communication and the identified FIB. As for the example, the network stack 1107 may identified the ipsec1 virtual interface 1114 based on the FIB 1108b and destination indicated in the request. At step 1308, communication from the enterprise application is routed to the virtual interface. In the example, the network stack 1107 routes, to the ipsec1 interface 814, communication from the enterprise application 1112c. Next, at step 1310, a VPN tunnel is established through a binding interface. Again in the example, the IPsec component 1116 establishes a VPN tunnel 1120 through the Wifi interface 1118b in the enterprise perimeter 1105. At step 1312, filtering rules are provided. As for the example, the IPsec component 1116 in the enterprise perimeter 1103 may transmit filtering rules to the packet filtering module 1109a in the personal perimeter 1103 and the packet filtering module 1109b in the enterprise perimeter 1105.

A communication request from a different enterprise application is received at step 1314. In the example, the enterprise application 1112a may transmit a communication request to the network stack 1107. At step 1316, the FIB assigned to the enterprise perimeter is identified. As for the example, the network stack 1107 may identify the FIB 1108b assigned to the enterprise perimeter 1103. Next, at step 1318, the binding interface is determined for the communication session based on the destination and the FIB. In the example, the network stack 1107 may determine that the communication is assigned to directly route to the Wifi interface 1118b based on the FIB 1108b and the destination. At step 1322, communication from the different enterprise application is filtered. As for the example, the packet filtering module 1109b filters communication from the enterprise application 1112b.

A communication request from a personal application is received at step 1324. In the example, the personal application 1112a may transmit a communication request to the network stack 1107. At step 1326, the FIB assigned to the personal perimeter is identified. As for the example, the network stack 1107 may identify the FIB 1108a assigned to the personal perimeter 1103. Next, at step 1328, the binding interface is determined for the communication session based on the destination and the FIB. In the example, the network stack 1107 may determine that the communication is assigned to directly route to the Wifi interface 1118b based on the FIB 1108a and the destination. Both the binding interface and IPsec component being in enterprise perimeter is determined to satisfy the filtering rules at step 1330. If personal applications are allowed access to enterprise interfaces at decisional step 1332, then, at step 1334, communication assigned to directly route to the binding interface is filtered. If the personal applications are not allowed access to the enterprise interfaces, then, at step 1336, the packets are routed directly to the binding interface. As for the example, the packet filtering module 1109a may determine whether the personal application 1112a is granted access to one or more enterprise interfaces. If access is not granted, the network stack 1107 may route communication from the personal application 1112a directly to the Wifi interface 1118b as illustrated by the signal path 1122 in FIG. 11. If access is granted, the packet filtering module 1109a may filter communication from the personal application 1112a as illustrated by the block signal path 1124 in FIG. 12.

FIG. 14 is a flow chart illustrating an example method 1400 for filtering packets in an MFIB system. While the method 1400 is described with respect to FIG. 1, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 1400 begins at step 1402 where the communication interface for a session is the binding interface for a VPN tunnel. For example, the packet filtering module 109a or 109b may determine that the communication interface for a session is the binding interface for a VPN tunnel. If both the virtual interface and the binding interface are in the same perimeter at decisional step 1404, then, at step 1406, communication from applications in the same perimeter and assigned to route directly to the binding interface is blocked. For example, the packet filtering module 109a, 109b may filter packets if both the binding and virtual interface are in the first perimeter 103 or the second perimeter 105. If personal applications are not allowed access to enterprise interfaces at decisional step 1408, then execution ends. If the personal applications are granted access to the enterprise interfaces, then, at step 1410, communication assigned to directly route to the binding interface are block in both the personal and enterprise interface. As for decisional step 1404, if the communication interface and the binding interface are in different perimeters, then execution proceeds to decisional step 1414. If the personal applications are granted access to enterprise interfaces, then, at step 1416, direct access to the binding interface in the personal perimeter is blocked. If the personal applications are not granted access, then execution ends.

A number of embodiments of the invention have been described. Nevertheless, it will be understood that various modifications may be made without departing from the spirit and scope of the invention. Accordingly, other embodiments are within the scope of the following claims.

What is claimed is:

1. A method for routing communication, comprising:
receiving a request for a communication session from an application running on a user device, wherein the user device includes two or more perimeters, a binding interface, and an Internet Protocol (IP) security (IPsec) interface wherein the binding interface comprises a wireless interface hardware component for the receiving of the request and the routing of the communications for the communications session, each of the two or more perimeters includes resources specific to each respective perimeter and is configured to prevent the resources specific to perimeters other than the each respective perimeter from accessing the resources specific to the each respective perimeter;
determining the binding interface for the communication session based on a forwarding information base (FIB) and a destination for the communication session, the binding interface shared with the two or more perimeters;
determining that a virtual private network(VPN) tunnel is currently established through the IPsec interface and the binding interface; and
determining whether to filter the communication session based on which of the two or more perimeters of the user device includes the binding interface and which of the two or more perimeters of the user device includes the IPsec interface when the VPN tunnel is currently established.

2. The method of claim 1, the method further comprising:
determining the binding interface, the IPsec interface, and the application are included in a same perimeter; and
filtering packets from the application to prevent direct access to the binding interface, wherein the filtered packets were generated for the communication session.

3. The method of claim 2, wherein the same perimeter is an enterprise perimeter, the method further comprising:
determining applications including the application in a personal perimeter are granted access to interfaces in the enterprise perimeter; and
filtering packets from the applications in both the personal perimeter and the enterprise perimeter to substantially prevent direct access to the binding interface, wherein the filtered packets were generated for the communication session.

4. The method of claim 1, the method further comprising:
determining the binding interface and the IPsec interface are included in different perimeters;
determining applications in a personal perimeter are granted access to interfaces in an enterprise perimeter; and
filtering packets from the applications in the personal perimeter to prevent direct access to the binding interface, wherein the filtered packets were generated for the communication session.

5. The method of claim 1, the method further comprising:
determining the binding interface and the IPsec interface are included different perimeters;
determining applications in a personal perimeter are prohibited access to interfaces in an enterprise perimeter; and
routing packets for the requested communication session to the binding interface.

6. The method of claim 1, wherein the user device comprises a mobile device.

7. The method of claim 1, wherein the binding interface comprises at least one of a Wifi interface, a cellular interface, or a frequency-hopping spread spectrum interface.

8. A computer program product encoded on a tangible, non-transitory storage medium, the product comprising computer readable instructions for causing one or more processors to perform operations comprising:
receiving a request for a communication session from an application running on a user device, wherein the user device includes two or more perimeters, a binding interface, and an Internet Protocol (IP) security (IPsec) interface, wherein the binding interface comprises a wireless interface hardware component for the receiving of the request and the routing of the communications for the communications session, each of the two or more perimeters includes resources specific to each respective perimeter and is configured to prevent the resources specific to perimeters other than the each respective perimeter from accessing the resources specific to the each respective perimeter;

determining the binding interface for the communication session based on a forwarding information base (FIB) and a destination for the communication session, the binding interface shared with the two or more perimeters;

determining that a virtual private network (VPN) tunnel is currently established through the IPsec interface and the binding interface; and determining whether to filter the communication session based on which of the two or more perimeters of the user device includes the binding interface and which of the two or more perimeters of the user device includes the IPsec interface when the VPN tunnel is currently established.

9. The computer program product of claim 8, the instructions further comprising:

determining the binding interface, the IPsec interface, and the application are included in a same perimeter; and filtering packets from the application to prevent direct access to the binding interface, wherein the filtered packets were generated for the communication session.

10. The computer program product of claim 9, wherein the same perimeter is an enterprise perimeter, the instructions further comprising:

determining applications including the application in a personal perimeter are granted access to interfaces in the enterprise perimeter; and filtering packets from the applications in both the personal perimeter and the enterprise perimeter to substantially prevent direct access to the binding interface, wherein the filtered packets were generated for the communication session.

11. The computer program product of claim 8, the instructions further comprising:

determining the binding interface and the IPsec interface are included different perimeters;

determining applications in a personal perimeter are granted access to interfaces in an enterprise perimeter; and filtering packets from the applications in the personal perimeter to prevent direct access to the binding interface, wherein the filtered packets were generated for the communication session.

12. The computer program product of claim 8, the instructions further comprising:

determining the binding interface and the IPsec interface are included in different perimeters;

determining applications in a personal perimeter are prohibited access to interfaces in an enterprise perimeter; and routing packets for the requested communication session to the binding interface.

13. The computer program product of claim 8, wherein the user device comprises a mobile device.

14. The computer program product of claim 8, wherein the binding interface comprises at least one of a Wifi interface, a cellular interface, or a frequency-hopping spread spectrum interface.

15. A user device for routing a communication, comprising:

memory that stores a plurality of FIBs including a FIB and an application, wherein each FIB in the plurality of FIBs identifies routes and interfaces for communicating messages; and one or more processors configured to:

receive a request for a communication session from an application running on a user device, wherein the user device includes two or more perimeters, a binding interface, and an Internet Protocol (IP) security (IPsec) interface wherein the binding interface comprises a wireless interface hardware component for the receiving of the request and the routing of the communications for the communications session, each of the two or more perimeters includes resources specific to each respective perimeter and is configured to prevent the resources specific to perimeters other than the each respective perimeter from accessing the resources specific to the each respective perimeter;

determine the binding interface for the communication session based on a forwarding information base (FIB) and a destination for the communication session, the binding interface shared with the two or more perimeters;

determine that a virtual private network (VPN) tunnel is currently established through the IPsec interface and the binding interface; and determine whether to filter the communication session based on which of the two or more perimeters of the user device includes the binding interface and which of the two or more perimeters of the user device includes the IPsec interface when the VPN tunnel is currently established.

16. The user device of claim 15, the processors further configured to:

determine the binding interface, the IPsec interface, and the application are included in a same perimeter; and filter packets from the application to prevent direct access to the binding interface, wherein the filtered packets were generated for the communication session.

17. The user device of claim 16, wherein the same perimeter is an enterprise perimeter, the processors further configured to:

determine applications including the application in a personal perimeter are granted access to interfaces in the enterprise perimeter; and filter packets from the applications in both the personal perimeter and the enterprise perimeter to substantially prevent direct access to the binding interface, wherein the filtered packets were generated for the communication session.

18. The user device of claim 15, the processors further configured to:

determine the binding interface and the IPsec interface are included different perimeters;

determine applications in a personal perimeter are granted access to interfaces in an enterprise perimeter; and filter packets from the applications in the personal perimeter to prevent direct access to the binding interface, wherein the filtered packets were generated for the communication session.

19. The user device of claim 15, the processors further configured to:
   determine the binding interface and the IPsec interface are included in different perimeters;
   determine applications in a personal perimeter are prohibited access to interfaces in an enterprise perimeter; and
   route packets for the requested communication session to the binding interface.

20. The user device of claim 15, wherein the binding interface comprises at least one of a Wifi interface, a cellular interface, or a frequency-hopping spread spectrum interface.

* * * * *